(12) United States Patent
Kamae et al.

(10) Patent No.: US 10,726,189 B2
(45) Date of Patent: Jul. 28, 2020

(54) LESS-PESSIMISTIC STATIC TIMING ANALYSIS FOR SYNCHRONOUS CIRCUITS

(71) Applicant: SanDisk Technologies LLC, Addison, TX (US)

(72) Inventors: Norihiro Kamae, Yokohama (JP); Minoru Yamashita, Kawasaki (JP); Biju Manuel, Bangalore (IN)

(73) Assignee: SanDisk Technologies LLC, Addison, TX (US)

( * ) Notice: Subject to any disclaimer, the term of this patent is extended or adjusted under 35 U.S.C. 154(b) by 3 days.

(21) Appl. No.: 16/042,693

(22) Filed: Jul. 23, 2018

(65) Prior Publication Data
US 2020/0026818 A1    Jan. 23, 2020

(51) Int. Cl.
*G06F 17/50* (2006.01)
*G06F 30/398* (2020.01)
*G06F 30/327* (2020.01)
*G06F 111/04* (2020.01)
*G06F 111/20* (2020.01)
*G06F 119/12* (2020.01)

(52) U.S. Cl.
CPC .......... *G06F 30/398* (2020.01); *G06F 30/327* (2020.01); *G06F 2111/04* (2020.01); *G06F 2111/20* (2020.01); *G06F 2119/12* (2020.01)

(58) Field of Classification Search
CPC .............. G06F 17/5081; G06F 17/505; G06F 2217/06; G06F 2217/02; G06F 2217/84
USPC .......................... 716/108, 113–115, 122, 134
See application file for complete search history.

(56) References Cited

U.S. PATENT DOCUMENTS

| | | | | |
|---|---|---|---|---|
| 5,452,239 | A * | 9/1995 | Dai | G06F 17/5027 703/19 |
| 6,643,829 | B1 * | 11/2003 | Borkovic | G06F 17/5045 716/103 |
| 6,851,098 | B2 | 2/2005 | Schultz | |
| 8,473,886 | B2 | 6/2013 | Sripada et al. | |
| 2002/0157074 | A1 | 10/2002 | Sato | |
| 2003/0229483 | A1 | 12/2003 | Boland et al. | |
| 2004/0225978 | A1 * | 11/2004 | Fan | G06F 30/30 716/103 |
| 2006/0112359 | A1 | 5/2006 | Becer et al. | |
| 2009/0064070 | A1 * | 3/2009 | Kitahara | G06F 17/5068 716/113 |
| 2012/0066656 | A1 | 3/2012 | Sripada et al. | |

(Continued)

OTHER PUBLICATIONS

Ben Telya, NAND Memory Device Interface to the TMS320VC55x, Texas Instruments, Jul. 2002 (26 pages).

(Continued)

*Primary Examiner* — Nghia M Doan
(74) *Attorney, Agent, or Firm* — Vierra Magen Marcus LLP

(57) ABSTRACT

A static timing analysis controller includes a feedback loop identification module that identifies invariable flip flop feedback loops of an integrated circuit design, and adds the identified feedback loops to false path lists. The static timing analysis controller then performs timing update operations and identifies hold violations based on the invariable flip flop feedback loops included in the false path list. In turn, the static timing analysis controller identifies reduced or less pessimistic numbers of hold violations, resulting in fewer buffers added to the integrated circuit design.

18 Claims, 9 Drawing Sheets

(56) References Cited

U.S. PATENT DOCUMENTS

2014/0250260 A1 9/2014 Yap
2017/0235868 A1 8/2017 Wrixon et al.

OTHER PUBLICATIONS

Nitin Singh et al., "Basics of Multi-cycle & false paths", Aug. 7, 2014 https://www.edn.com/design/integrated-circuit-design/4433229/Basics-of-multi-cycle---false-paths (9 pages).

* cited by examiner

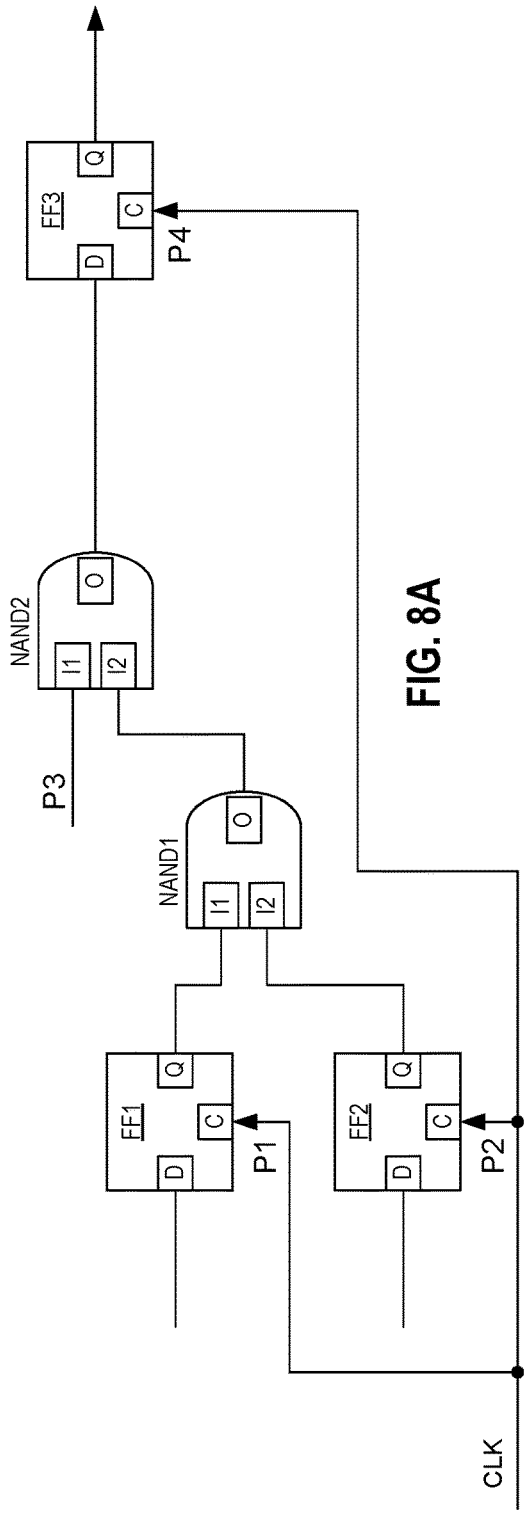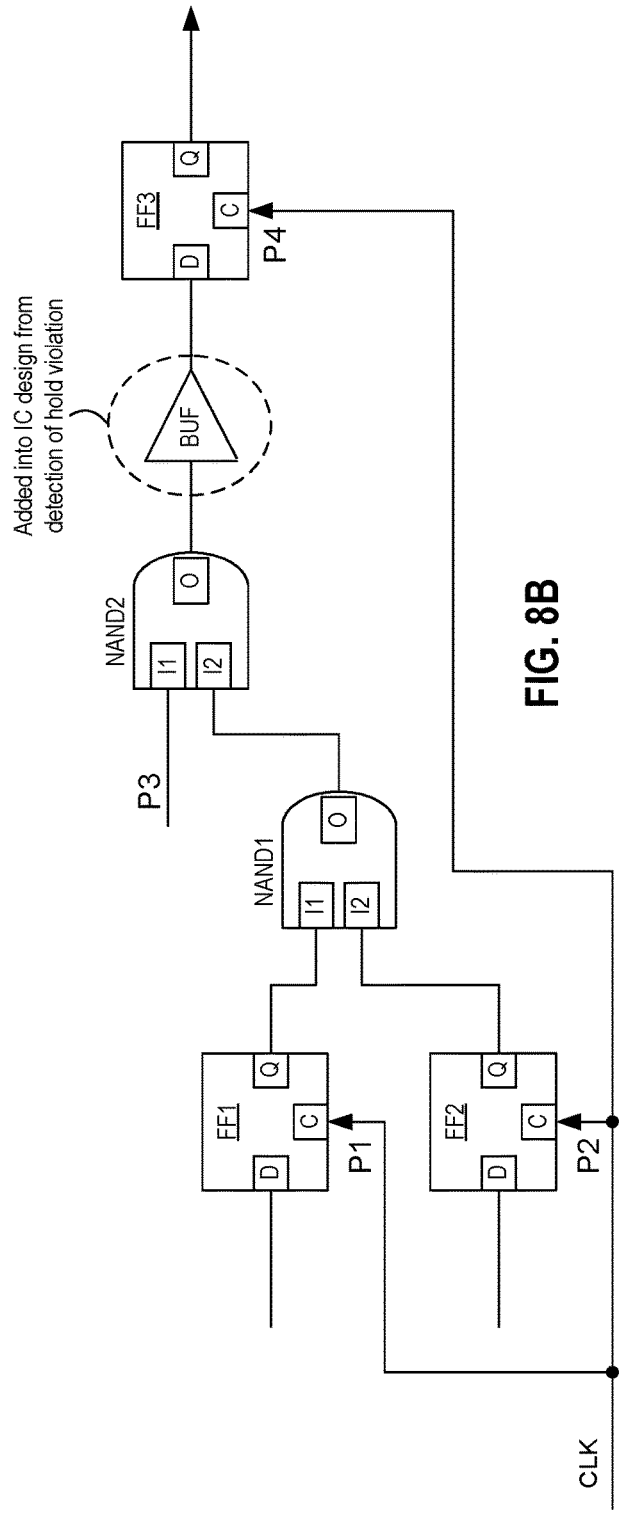

US 10,726,189 B2

LESS-PESSIMISTIC STATIC TIMING ANALYSIS FOR SYNCHRONOUS CIRCUITS

BACKGROUND

Integrated circuit (IC) designs include large numbers of logic gates and synchronous devices connected by interconnects. ICs are designed according to an IC design flow that specifies the steps and order of the steps performed to design an IC. Some of the steps are automated through implementation of electronic design automation (EDA). The computer software programs that run on computers to contribute to the IC design and/or analyze the IC design are referred to as EDA tools.

One type of EDA tool is a static timing analysis (STA) tool that performs a timing analysis that analyzes an IC design to ensure that timing constraints are met. The STA tool identifies timing violations where the timing constraints are not met, and fixes the timing violations by adding various delays, such as in the form of buffers, that affect the timing of signals propagating through the IC.

Computers, through execution of STA tools, are used to perform the timing analysis given the complexity of IC designs. However, because of their complexity, the STA tools may overestimate the number of timing violations in an IC design upon performing a timing analysis, which in turn may cause the STA tool to add more buffers that are needed to adequately fix the timing problems in the design. As a result, the IC design is larger in size (or footprint) than it needs to be. Thus, ways to improve the STA tools to reduce the overestimation of timing violations and the number buffers unnecessarily added to the IC design may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 8A is a block diagram of a portion of an example integrated circuit design.

FIG. 8B is the portion of the example integrated circuit design of FIG. 8A, illustrating a buffer added to fix a hold violation.

DETAILED DESCRIPTION

Figure 1:
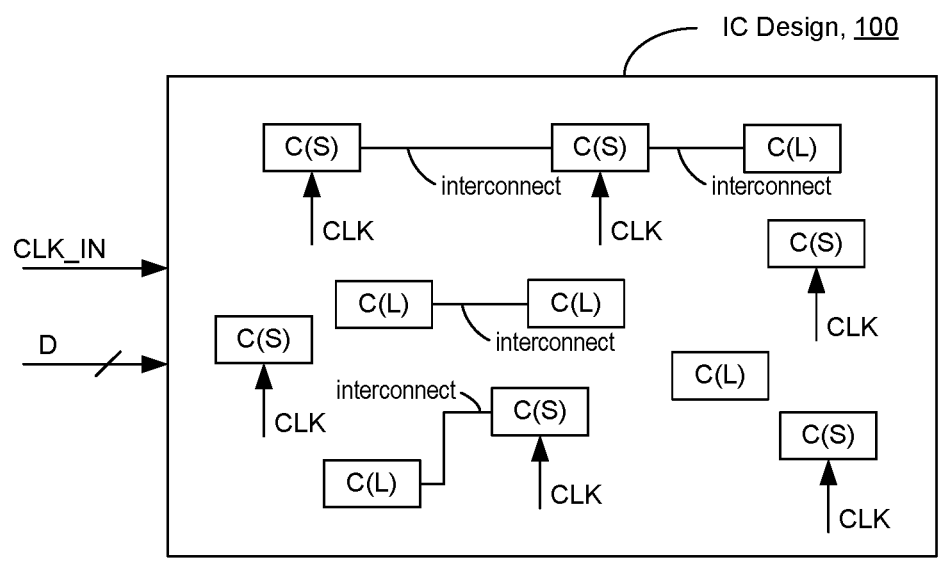
FIG. 1 is a schematic diagram of an example integrated circuit design.

The following embodiments describe systems, apparatuses, devices, circuits, computer systems, computer readable storage medium, computer program products, and methods for improving static timing analyses performed on integrated circuit (IC) designs. In particular, the following embodiments perform improved static timing analyses by ignoring invariable flip flop feedback loops. As used herein, an invariable flip flop feedback loop is a feedback loop of a flip flop that generates a voltage at a data input terminal of the flip flop that is always at the same logic level as the voltage at a data output terminal of the flip flop. By ignoring invariable flip flop feedback loops, a computing device performing a static timing analysis on an integrated circuit design that includes flip flops with invariable flip flop feedback loops refrains from calculating propagation delays through the invariable flip flop feedback loops, refrains from identifying hold violations for the invariable flip flop feedback loops, and refrains from adding buffers to the invariable flip flop feedback loops in order to fix hold violations. In turn, a computing device, through performance of the improved static timing analysis, more accurately determines numbers of hold violations in an IC design in that it lowers the excessive number of violating paths it identifies during the static timing analysis. Additionally, a computing device, through performance of the improved static timing analysis, reduces the number buffers added to the IC design to fix hold violations, resulting in an IC design that not only meets timing requirements, but that is also better optimized with respect to size, component count, and power consumption.

In one embodiment, an apparatus includes a static timing analysis controller including: a feedback loop identification module configured to identify an invariable flip flop feedback loop of an integrated circuit design, and a timing violation identification module configured to identify hold violations in the integrated circuit design by ignoring the invariable flip flop feedback loops.

In some embodiments, the static timing analysis controller includes a timing update module configured to refrain from calculating a delay for the invariable flip flop feedback loop.

In some embodiments, the static timing analysis controller further includes a hold violation fix module configured to fix the hold violations dependent on the timing violation identification module ignoring the invariable flip flop feedback loop.

In some embodiments, the hold violation fix module is configured to refrain from inserting a buffer into the invariable flip flop feedback loop.

In some embodiments, the feedback loop identification module is configured to add the invariable flip flop feedback loop to a false path list.

In some embodiments, the feedback loop identification module is configured to add the invariable flip flop feedback loop to the false path list for both a rising transition and a falling transition at a data output terminal of a flip flop connected to the invariable flip flop feedback loop.

In some embodiments, the feedback loop identification module is configured to: access a cell list of the integrated circuit design, identify a plurality of flip flops in the cell list, and identify a plurality of invariable flip flop feedback loops connected to the plurality of flip flops.

In some embodiments, the feedback loop identification module is configured to traverse feedback loops of the plurality of flip flops to identify the plurality of invariable flip flop feedback loops.

In some embodiments, the feedback loop identification module is configured to identify the invariable flip flop feedback loop of an enable D flip flop of the integrated circuit design.

In some embodiments, the feedback loop identification module is configured to identify the invariable flip flop feedback loop of an address block of the integrated circuit design.

In some embodiments, the feedback loop identification module is configured to identify the invariable flip flop feedback loop of a finite state machine of the integrated circuit design.

In another embodiment, a method includes: selecting, with a static timing analysis controller, a flip flop from a cell list for an integrated circuit design; identifying, with the static timing analysis controller, an invariable flip flop feedback loop of the flip flop; and calculating, with the static timing analysis controller, delays of a plurality of timing paths of the integrated circuit design by ignoring the invariable flip flop feedback loop.

In some embodiments, the method further includes: traversing, with the static timing analysis controller, through a feedback loop of the flip flop to identify the invariable flip flop feedback loop.

In some embodiments, the method further includes: traversing, with the static timing analysis controller, through a second feedback loop of the flip flop.

In some embodiments, the method further includes: adding, with the static timing analysis controller, the invariable flip flop feedback loop to a false path list.

In some embodiments, the method further includes: identifying, with the static timing analysis controller, hold violations in the integrated circuit design dependent on ignoring the invariable flip flop feedback loop.

In some embodiments, the method further includes: adding, with the static timing analysis controller, one or more buffers into the plurality timing paths dependent on ignoring the invariable flip flop feedback loop.

In some embodiments, the method further includes: receiving, with the static timing analysis controller, a software code that instructs the static timing analysis controller to iterate through a plurality of flip flops listed in the cell list, traverse through a plurality of feedback loops connected to the plurality of flip flops, and identify a plurality of invariable flip flop feedback loops from among the plurality of feedback loops.

In some embodiments, the flip flop includes an enable D flip flop.

In another embodiment, a non-transitory computer readable storage medium stores computer instructions executable by a processor. The computer instructions includes: instructions to identify a plurality of flip flops of an integrated circuit design; instructions to traverse feedback loops of the plurality of flip flops; instructions to determine a set of invariable flip flop feedback loops from among the feedback loops in response to the traversing; instructions to execute a timing update phase of a static timing analysis that ignores the set of invariable flip flop feedback loops; instructions to identify hold violations in response to execution of the timing update phase; and instructions to add buffers to the integrated circuit design in response to the identified hold violations.

In some embodiments, at least one of the plurality of flip flops includes an enable D flip flop.

Other embodiments are possible, and each of the embodiments can be used alone or together in combination. Accordingly, various embodiments will now be described with reference to the attached drawings.

FIG. 1 shows a schematic diagram of an example IC design 100 on which the improved static timing analysis may be performed. In general, an integrated circuit (IC)—also referred to as a monolithic IC, a chip, or a microchip—is an assembly or a collection of electronic circuit components (including active components, such as transistors and diodes, and passive components, such as capacitors and resistors) and their interconnections formed as a single unit, such as by being fabricated, on a substrate typically made of a semiconductor material such as silicon. An IC design is a representation of an IC, typically in the form of one or more data files, that provides the specifications for manufacturing the IC. An IC design may generally be in two forms, including a logical design and a physical design. A logical design identifies the circuit elements, or cells, of the IC, including the types of cells and the numbers of cells. The logical design also identifies the interconnects that connect the inputs and outputs of the cells to one another, specifically how the interconnects connect the inputs and outputs of the cells to each other. The physical design identifies the physical layout of the cells and the interconnects from the logical design.

FIG. 1 shows the IC design as including a plurality of cells, including logic cells C(L) and synchronous cells C(S). As used herein, a cell is a circuit element, or circuit component, of an IC of a predetermined or predefined type, having a predetermined or predefined set of one or more inputs and one or more outputs, and a predefined functionality or response.

A synchronous cell C(S) is a cell that generates an output signal dependent on triggering transitions (or edges) of a clock signal CLK. A synchronous cell C(S) includes a clock input terminal (or just clock terminal) configured to receive the clock signal CLK. Example synchronous cells C(S) include flip flops and latches.

In further detail, a synchronous cell C(S) generates an output signal dependent on triggering transition by performing capturing actions in response to detecting triggering transitions of a clock signal CLK. As used herein, a capturing action is an action performed to determine, identify, detect, capture, obtain, sample, hold onto, or latch onto, a level or magnitude of an input signal at a given point in time. A synchronous cell performing a capturing action on an input signal may include a data input terminal configured to receive the input signal. In addition, a synchronous cell C(S) performing a capturing action may output or present the level of the input signal that it captures. The synchronous cell C(S) may do so by generating an output signal at a data output terminal of the synchronous cell C(S) at a level that indicates or corresponds to the level of the input signal that the synchronous cell C(S) identifies at its input terminal. Accordingly, a synchronous cell C(S) captures an input signal, captures a level of the input signal, or performs a capturing action on an input signal by identifying a level of an input signal and outputting an output signal at a level indicating the level of the input signal that it identifies.

In particular example configurations, a synchronous cell C(S) generates its output signal at a level that matches, directly corresponds to, or is equal in value (e.g., logic value) to the level of the input signal that it identifies. For example, if the synchronous cell C(S) identifies its input signal at a low level, then the synchronous cell C(S) performs a capturing action by generating its output signal at its output terminal at a low level, and if the synchronous cell C(S) identifies its input signal at a high level, then the synchronous cell C(S) performs a capturing action by generating its output signal at its output terminal at a high level.

In addition, a synchronous cell C(S) performs capturing actions in response to detecting triggering transitions of a clock signal. A triggering transition is a transition of a clock signal that causes or triggers a synchronous cell C(S) to perform a capturing action. A triggering transition may be of a particular type, such as a rising transition or a falling transition, although in some embodiments, triggering transitions may include both rising transitions and falling transitions. Each time a synchronous cell C(S) detects a triggering transition, the synchronous cell C(S) performs a capturing action.

Also, as used herein, a logic cell is a cell other than a synchronous cell C(S)—i.e. a cell that does not generate an output signal dependent on detection of triggering transitions (or edges of a clock signal CLK. Types of logic cells include logic gate cells (or logic gate circuits or circuit elements) that perform logical operations on one or more binary inputs, non-limiting examples of which include: NOT gates, AND gates, OR gates, NAND gates, NOR gates, XOR gates, and XNOR gates. Types of logic cells also include other circuit elements that perform selection function in response to a selection signal (also referred to as a control signal or an enable signal), non-limiting examples of which includes multiplexers and demultiplexers. A multiplexer is a circuit that selects one of a plurality of input signals and outputs the selected input signal as its output signal. Upon selecting an input signal, the multiplexer forwards the selected input signal to its output terminal. A demultiplexer is a circuit that selects one of a plurality of output terminals and outputs an input signal to the selected output terminal. Upon selecting an output terminal, the demultiplexer forwards the input signal to the selected output terminal. Groups or combinations of the logic cells form combinational logic circuits, which are circuits that generate output signals as pure functions of the present input only. Another type of logic cell C(L) is a buffer, which is a circuit element that delays an input signal it receives by a certain, predetermined unit of time to generate and output and output signal.

In an IC (and its design), the synchronous cells C(S) and the logic cells may be connected to each other in any of various ways in order to carry out intended functions. For example, as indicated in FIG. 1, output and input terminals of different synchronous cells C(S) can be connected to each other, output and input terminals of different logic cells C(L) can be connected to each other, output terminals of synchronous cells C(S) can be connected to input terminals of logic cells C(L), and output terminals of logic cells C(L) can be connected to input terminals of synchronous cells C(S). Input and output terminals of cells are connected to one another with interconnects. An interconnect is a connection from a first terminal to a second terminal that communicates a signal from the first terminal to the second terminal, where each of the first terminal and the second terminal are either input terminals or output, where the first and second terminal are of the same cell or different cells.

The IC design 100 in FIG. 1 shows various synchronous cells C(S) and logic cells C(L), with some of them having their input and outputs connected with interconnects. The IC design 100 is merely an example for illustrative purposes. Actual ICs may include cell numbers on the order of millions or billions.

Also, FIG. 1 shows the IC design 100 configured to receive an input clock signal CLK_IN and one or more data signals D, which may be input to the IC design 100 in parallel with each other. Although not expressly shown in FIG. 1, the IC design 100 may include a clock tree or clock distribution circuit that distributes the input clock signal CLK_IN to one or more of the synchronous cells C(S). In some example configurations, the input clock signal CLK_IN may be processed and output by one or more synchronous cells C(S) and/or logic cells C(L) before one or more other synchronous cells C(S) receive a clock signal CLK. A data signal may be generally any type of signal, other than a clock signal, that carries information for the IC to process or perform functions on. Example types of information may include data to be stored by memory of the IC, commands that instruct the IC to enter into a given operating state or a function to perform, or address information identifying where certain data is currently stored, or is to be stored.

Before describing IC designs in further detail, some characteristics of signals are described. In general, a signal, such as a clock signal or a data signal, may be at a level at a given point in time. As used herein, a level of a signal at a given point in time is a magnitude value, such as a voltage magnitude value or a current magnitude value. In some cases, the signal may be referred to as being at a high level or at a low level, transitioning between a high level and a low level, or transitioning between a low level and a high level. In general, a high level and a low level are both magnitude values, where the high level is higher in magnitude than the low level. A high level of a signal may be a single high level, a level that is within a set or range of high levels, a maximum high level or a minimum high level of a set or range of high levels, or an average high level of a set or range of high levels. Similarly, a low level of a signal may be a single low level, a level that is within a set or range of low levels, a maximum low level or a minimum low level of a set or range of low levels, or an average low level of a set or range of low levels.

In addition or alternatively, a high level of a signal is a level that is at or above a minimum high level $V_{H\_MIN}$, and a low level of the signal is a level that is at or below a maximum low level $V_{L\_MAX}$. The minimum high level $V_{H\_MIN}$ and the maximum low level $V_{L\_MIN}$ may be predetermined levels or values, and in particular example configurations, predetermined levels or values specified as part of a swing requirement with which the source circuit 102 is configured to comply when transmitting the signal. A signal that transitions according to and/or in compliance with the swing requirement transitions to a high level that is at or above the minimum high level $V_{H\_MIN}$ of the swing requirement, and transitions to a low level that is at or below the maximum low level $V_{L\_MAX}$ of the swing requirement.

In addition or alternatively, a level may correspond to or indicate a logic value, such as a binary logic value or a bit value. For example, a high level of a signal corresponds to or indicates a logic "1" value, and a low level corresponds to or indicates a logic "0" value.

In general, a signal performs transitions between its high level and its low level. A given transition of a signal may be one of two transition types, including a rising transition and a falling transition. A signal performs a rising transition when the signal transitions from its low level to its high level, and performs a falling transition when the signal transitions from its high level to its low level.

A portion of a magnitude waveform of a signal over a transition is referred to as an edge. In particular, a portion of the magnitude waveform over a rising transition is a rising edge and a portion of the magnitude waveform over a falling transition is a falling edge.

Also, a clock signal, such as the input clock signal CLKIN input to the IC design 100 and the various clock signals CLK input to the synchronous cells C(S), is a signal that has repetitive cycles occurring over successive periods T. Within each period T, a first portion of a respective cycle occurs first in time and a second portion of the respective cycle occurs second in time—i.e., after the first portion. After the second portion of one cycle occurs, the first portion of a next cycle occurs. Within a cycle, one of the portions is at a high level and the other portion is at a low level. Accordingly, the portions may be defined by consecutive rising and falling transitions or edges of the clock signal. For example, a given rising edge or a given falling edge may define or mark a boundary when one portion ends and a next portion, either of the same cycle or a next cycle, begins.

In addition, a clock signal may include clock pulses that are formed or defined by the rising and falling edges of the clock signal. In particular example configurations, the clock pulses of a clock signal correspond to the high level of the clock signal, in that each clock pulse is defined by a rising edge followed by a period where the clock signal is at its high level, and then followed by a falling edge. A pulse width of a given clock pulse is a time duration extending from a time that the magnitude of the rising edge of the clock pulse is at or rises to a predetermined level (e.g., 50% of the high level) to a time that the magnitude of the falling edge of the clock pulse is at or falls to the predetermined level. The clock pulses of the clock signal may occur according to the frequency of the clock signal.

In addition, a clock signal has an associated duty cycle. As used herein, a duty cycle of a clock signal is the percentage or fraction of one period that the clock signal is at its high level. In addition or alternatively, the duty cycle of a clock signal is the ratio of a pulse width of a clock pulse in a single period or cycle of the clock signal to a total time duration of the period or cycle.

Additionally, a data signal is a signal that carries and/or includes data. The data carried by and/or included in a data signal includes a bit sequence of bits, where each bit includes or has a single-bit logic value of "1" or "0". The data signal may include a series or sequence of data pulses corresponding to a bit sequence of the data. A data pulse is a portion of the magnitude waveform of the data signal that represents one or more bits of the bit sequence. Each data pulse may be at a level that indicates a data value, otherwise referred to as a logic level or a logic value. In addition, each data value is represented by a binary number or a binary value that includes one or more digits corresponding to and/or representing the one or more bits of the bit sequence. A duration of a data pulse is an amount of time that the level of the data pulse indicates the data value that the data pulse represents.

Figure 2:
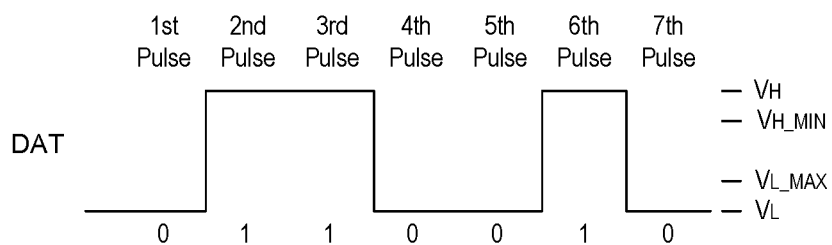
FIG. 2 is an example timing diagram of a waveform of a data signal.

FIG. 2 shows a timing diagram of a magnitude waveform of at least a portion of an example data signal DAT, which may be representative of at least a portion of a data signal input to an IC design 100 (or received by an actual IC). For purposes of illustration, the example data signal DAT shown in FIG. 2 includes seven data pulses. Each data pulse is shown as being either at a high level at or above a minimum high level $V_{H\_MIN}$ or at a low level at or below a maximum low level $V_{L\_MAX}$. For the example data signal DAT in FIG. 2, the high level and the low level each indicate a single-bit logic or data value of "1" or "0", where the high level corresponds to and/or indicates a single-bit logic or data value of "1" (otherwise referred to as a logic 1 value) and the low level corresponds to and/or indicates a single-bit logic or data value of "0" (otherwise referred to as a logic 0 value). Other example data signals where different levels of the magnitude waveform correspond to and/or indicate multi-bit logic values (i.e., logic values that each include two or more digits or bits) may be possible.

For two consecutive data pulses of the data signal DAT, where the two consecutive pulses correspond to different logic levels, the data signal DAT performs a rising transition or a falling transition to transition between the two consecutive data pulses. For the example shown in FIG. 2, where one pulse in the sequence indicates a logic 0 value and a next pulse in the sequence indicates a logic 1 value, the data signal DAT performs a rising transition to transition between the first and second pulses. On the other hand, where one pulse corresponds to a logic 1 value and a next pulse indicates a logic 0 value, the data signal DAT performs a falling transition to transition between the first and second pulses. In addition, where two consecutive pulses indicate the same logic level, then as the pulse sequence transitions from the first data pulse to the next data pulse, the level of the data signal DAT stays the same during those two pulses, and a rising transition or a falling transition may not occur. Regardless of whether a change in level of the data signal DAT occurs when transitioning between two consecutive data pulses, the start of a given data pulse is referred to as a starting transition of the data pulse, and the end of a given data pulse is referred to as an ending transition of the data pulse.

In some example configurations, the IC design 100 may be for an IC implemented in a source synchronous system. In general, a source synchronous system is a system in which a source circuit sends a data signal along with a clock signal to a destination circuit in order for the destination circuit to use the clock signal to identify the data values of the data signal.

Figure 3:
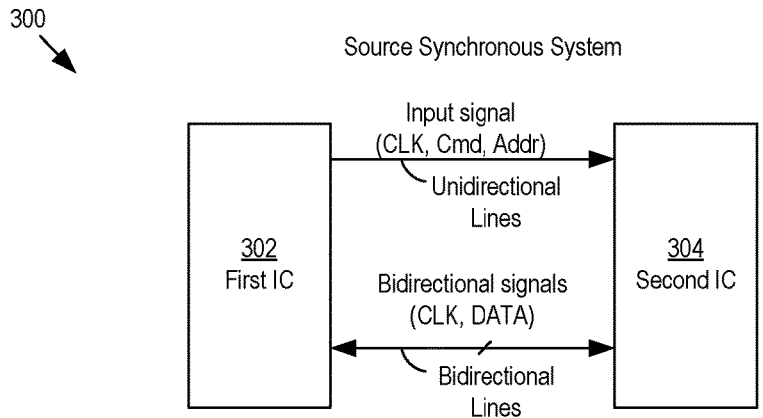
FIG. 3 is a block diagram of an example source synchronous system.

FIG. 3 shows a block diagram of an example source synchronous system 300 that includes ICs that may designed from an IC design flow using the improved static timing analysis. The source synchronous system 300 includes a first IC 302 and a second IC 304. In some example configurations, the roles of the ICs 302, 304 may be fixed. One of the ICs 302, 304 functions as the source circuit, and the other IC 302, 304 functions as the destination circuit. In other example configurations, the roles of the ICs 302, 304 as the source and destination circuits may switch. At some times or for some operations, the first IC 302 operates as the source circuit and the second IC 304 operates as the destination circuit—i.e., the first IC 302 sends data signals and clock signals to the second IC 304. At other times or for other operations, the second IC 304 operates as the source circuit and the first IC 302 operates as the destination circuit—i.e., the second IC 304 sends data signals and clock signals to the second IC 304.

In some example configurations, the source synchronous system 300 is a memory system, where the first IC 302 is a controller of the memory system 300, and the second IC 304 is a memory die that includes a memory array for storing data. The controller IC 302 may perform system level memory management functions, non-limiting examples of which include: communicating with a host device, such as responding to host read and write commands; manage an address translation system that maps physical addressing schemes used by the memory system with host addressing schemes used by a host; and determining where to store data, among other functions. The memory die (or IC) 304 may receive from controller 302 data signals that carry: data to be stored in its memory array, commands that instruct the memory die 304 to perform certain memory operations (e.g., read, write (program), and erase operations), and address information that identifies where data is to be stored for performance a write operation, or from where data is to be retrieved for performance of a read operation.

Where the controller IC 302 and the memory die 304 communicate with each other to execute a write (or program) operation, the controller IC 302 functions as the source circuit and sends data that it wants the memory die 304 to store in the form of one or more data signals in parallel with a clock signal. The controller IC 302 may also send address signals and/or command signals to the memory die 304 for performance of the write operation. From the perspective of the memory die 304, a write operation may be considered a data-in operation, since the memory die 304 is receiving data it is to program in the memory array. The memory die 304, functioning as the destination circuit, uses the clock signal to identify the logic values indicated by the pulses of the data signals carrying the data, commands, and the address information.

Additionally, where the controller IC 302 and the memory die 304 communicate with each other to execute a read operation, the memory die 304 functions as the source circuits and sends data that it retrieved from its memory array, in parallel with a clock signal, to the controller IC 302, which is functioning as the destination circuit. From the perspective of the memory die 304, a read operation may be considered a data-out operation, since the memory die 304 is sending data along with a clock signal to the controller IC 302.

Additionally, for some example source synchronous systems, such as source synchronous memory systems, the first IC 302 and the second IC 304 may communicate over unidirectional lines, bidirectional lines, or a combination thereof. For example, in some source synchronous memory systems, to perform a read operation, the controller IC 302 sends a clock signal to the memory die 304 over a unidirectional line, and the memory die 304 sends clock and data signals over bidirectional lines to the controller IC 302. To perform a write operation, the controller IC 302 sends a clock signal and data signals over a bidirectional line to the memory die 304. In addition or alternatively, the controller IC 302 may send address and command signals over unidirectional lines to the memory die 304, and the controller IC 302 and the memory die 304 may communicate data between each other over bidirectional lines, depending on whether the operation being performed is a read operation or a write operation. Various configurations may be possible.

Figure 4:
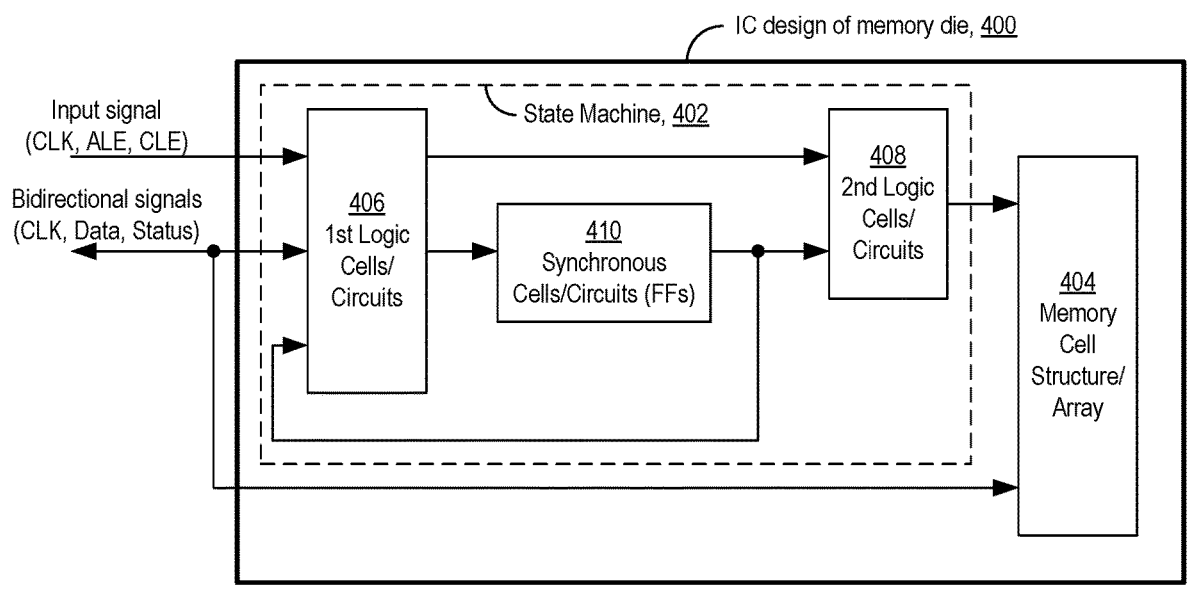
FIG. 4 is a schematic diagram of setup and hold time requirements of the sampling circuit of FIG. 3.

FIG. 4 shows a schematic diagram of an example configuration of a memory die 400, which may be designed in an IC design flow using the improved static timing analysis. The memory die 400 may be representative of a configuration of the memory die 304 of the source synchronous memory system 300 in FIG. 3. As shown in FIG. 4, the memory die 400 may include a state machine 402 and a memory cell structure 404 of memory cells, which may be configured in an array. The memory cells may be any type of volatile or non-volatile memory technology.

The state machine 402 may be configured to control memory operations within the memory die 400, such as read, write (program), and erase operations. In particular example configurations, the state machine 402 is a finite state machine, such as a Mealy machine, for example.

In addition, as shown in FIG. 4, the state machine 402 may include a first plurality or set of logic cells 406, a second plurality or set of logic cells, and a plurality of synchronous cells. The first set of logic cells 406 may interface with the unidirectional and bidirectional lines, and receive clock signals CLK, address signals (e.g., address latch enable (ALE) signals), control signals (e.g., control latch enable (CLE) signals), and data signals, as well as output clock, data, and status signals. Additionally, the first set of logic cells 406 and the synchronous cells 410 may send and receive signals between each other in order to send and receive signals from over the bidirectional and unidirectional lines, generates signals that can be sent to the memory cell structure 404, and enter into or transition between states in order to perform memory operations on the memory die 400. The second set of logic cells 408 may function as the interface between the memory cell structure 404 and the first set of logic cells 406 and the synchronous cells 410. Additionally, in some example configurations, as shown in FIG. 4, the memory cell structure 404 may be configured to communicate directly with the bidirectional lines, bypassing the state machine.

Figure 5:
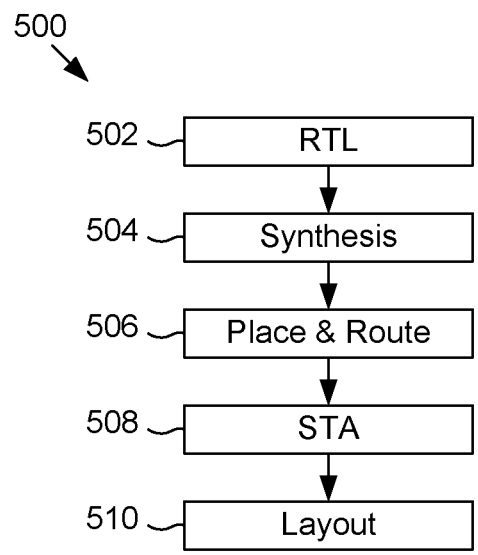
FIG. 5 is a flow chart of a portion of an integrated design flow.

FIG. 5 shows a flow chart of a portion of an example design flow 500 for designing an integrated circuit IC in which the improved static timing analysis can be implemented. An IC design flow generally includes two main phases, including a logical design phase and a physical design phase. The logical design phase generally includes the design of the circuit elements or cells of the IC (including the types of cells, the numbers of each of the cell types), and the design of the interconnects that connect the inputs and outputs of the cells to one another. The physical design phase includes the design of the physical layout of the cells and the interconnects determined from the logical design phase.

The example design flow 500 shows steps of at least portions of the logical and physical design phase. The steps shown in FIG. 1 are implemented through electronic design automation (EDA) in that EDA controllers performing EDA functions or operations are used to create, revise, evaluate, and analyze an IC design. As used herein, an EDA controller is a controller that performs or carries out EDA functions or operations of an IC design flow.

In general, as used herein, a controller is a component, or module, designed, and built, to perform, control the performance of, execute, or carry out an associated set of actions, operations, or functions. In certain embodiments, a controller comprises hardware, or a combination of hardware and firmware (or software). For example, a controller may include or be a component of an integrated circuit (IC), such as an application specific integrated circuit (ASIC) or a field programmable gate array (FPGA), a circuit, a digital logic circuit, an analog circuit, a combination of discrete circuits, gates, or any other type of hardware or combination thereof. In addition or alternatively, a controller can take the form of processing circuitry, such as a microprocessor or a processor, that executes computer instructions to implement, perform, execute, or carry out one or more features or functions of the controller. In addition, or alternatively to including processing circuitry, a controller may include memory hardware that comprises instructions executable with a processor or processing circuitry to implement one or more of the features of the controller. In addition or alternatively, a controller comprises one or more computer-readable media (e.g., one or more non-transitory computer readable storage media) that store(s) computer-readable program code (e.g., software or firmware) executable by a (micro)processor, logic gates, or an integrated circuit.

During a register transfer-level (RTL) step 502, an EDA controller generates, such as through receipt of inputs from an IC designer, a RTL description of the IC design. The RTL description describes the functional behavior of the IC, including how the logical operations on signals enable data to flow between the synchronous cells in an IC design. The RTL controller may generate an RTL description in various forms of data formats, typical examples of which include hardware description languages (HDL), such as Verilog, SystemVerilog, or Very High Speed Integrated Circuit Hardware Description Language (VHDL). In addition, in the RTL step 102, EDA controller performs a verification process to verify that the IC design is achieving a desired functionality. To do so, the EDA controller applies stimuli, such as in the form of test vectors, to the RTL description of the IC design to induce a response, and measures the response of the RTL description to assess the functionality of the IC design.

During a synthesis step 504, an EDA controller, such as through execution of a synthesis software tool, translates the RTL description generated in the RTL step 502 to a gate-level netlist, which is a description of the electronic components or cells of the IC design and a list of nodes to which the components are connected. The gate-level netlist may be considered a hardware equivalent description of the functionality described by the RTL description. Additionally, during synthesis, the EDA controller may identify certain operation parameters of the IC, such as frequency, delays, and identification of a standard cell library, which is a collection of cell types, including types of logic cells C(L) and synchronous cells C(S). A standard cell library includes two main components, including a library database and a timing abstract. A library database includes various cell views, non-limiting examples of which include layout views, schematic views, symbol views, or abstract views. A timing abstract includes functional definitions, timing, power, and noise information of the various cell types.

During a place and route step 506, an EDA controller physically positions or places the cells, and/or determines the physical locations of the cells, of the IC design within a physically defined space. In addition, an EDA controller adds the interconnects to properly connect the placed cells.

During a static timing analysis (STA) step 508, an STA controller, which may be a particular type of EDA controller, performs static timing analyses. A static timing analysis is an EDA task, method, or operation that analyzes an IC design to determine if the IC design satisfies timing constraints of the synchronous cells C(S). The design flow 500 shows the STA step 508 occurring after the place and route step 506. However, in various embodiments, the STA step 508 may be performed one or more times at any of various points throughout the design flow 500, such as after the synthesis step 504, after the place and route step 506 (as shown in FIG. 5), or after a layout step 510. In addition or alternatively, the STA step 508 may create an iterative design flow process, where one or more of the other steps of the IC design flow are repeated based on results of the STA step 508. In the layout step 510, the EDA controller may expand upon the actions performed during the place and route step 506, and further develop the IC design into a finalized physical design from which ICs can be manufactured. Non-limiting example actions performed during the layout step 510 include physical verification, tape-out, resolution enhancement, and mask data preparation.

Referring back to the STA step 508, when performing a static timing analysis, an STA controller computes or calculates arrival times or time windows within which various signals can reach various points or nodes in the IC design. An arrival time is an amount of elapsed time for a signal to arrive at a certain point or node in an IC design from a reference point or node (also referred to as a start node). An arrival time is equal to a sum of delays associated with interconnects and cells lying between the start/reference node and the node for which STA controller is calculating the arrival time. Upon calculating an arrival time windows, the STA controller compares the calculated time windows against required times when those signals are required at those points or nodes. A required time is a limiting time for the arrival time, and defines a time for a signal to arrive at a given node to ensure stable circuit behavior.

Through performance of static timing analyses, the STA controller ensures or verifies that the IC design does not include timing violations or negative slacks. Slack is the difference between arrival time and a corresponding required time. A timing violation, also referred to as negative slack, is an event that occurs when a calculated arrival time of a signal violates a required time for the signal to arrive. Timing violations lead to unstable circuit behavior.

Figure 6:
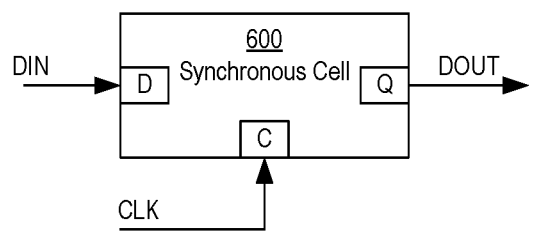
FIG. 6 is block diagram of an example synchronous cell.
Figure 7:
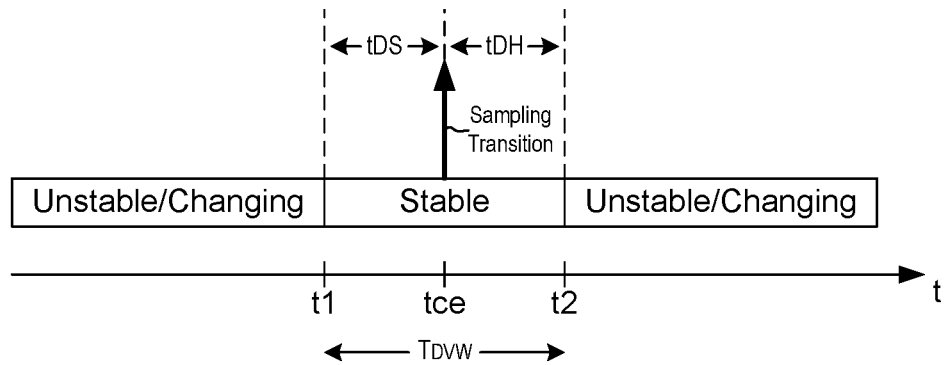
FIG. 7 is a schematic diagram of setup and hold time requirements of the sampling circuit of FIG. 6.

Required times and timing violations are described in further detail with respect to FIGS. 6 and 7. FIG. 6 is a block diagram of an example synchronous cell/circuit element, such as a flip flop or a latch, 300. The synchronous cell 600 includes a data input terminal or node D, a data output terminal or node Q, and a clock input terminal or node C. The data input terminal D is configured to receive an input data signal DIN of which the synchronous cell 600 is configured to capture levels. The clock input terminal C is configured to receive a clock signal CLK of which the synchronous cell 600 is configured to detect triggering transitions. The data output terminal Q is configured to output an output data signal DOUT at levels and at times based on the levels of the input data signal DIN and the triggering transitions of the clock signal CLK. In particular, the synchronous cell 600 is configured to detect when each of the triggering transitions of the clock signal CLK occur. When the synchronous cell 600 detects that a triggering transition occurs, the synchronous cell 600 captures the level of the input data signal DIN at the data input terminal D, and generates the output data signal DOUT at the level of the input data signal DIN that the synchronous cell 600 identified. The synchronous cell 600 maintains or holds the output data signal DOUT at the data output terminal Q at the level it identified until it detects the next triggering transition of the clock signal CLK. The synchronous cell 600 is considered to "launch" the pulse of the input data signal DIN at the data input terminal D to the data output terminal Q upon detection of the triggering transition. Upon detecting the next triggering transition of the clock signal CLK, the synchronous cell 600 will again identify or capture the level of the input data signal DIN at the data input terminal D, and launch the level to the data output terminal Q by generating the output data signal DOUT at the level of the input data signal DIN that the synchronous cell 600 identified in response to the next triggering transition. The synchronous cell 600 may continue to operate in this manner as it continues to receive additional data pulses of the input data signal DIN and detect triggering transitions of the clock signal CLK.

For a given data pulse of the input data signal DIN that the synchronous cell 600 captures, the synchronous cell 600 may either capture the data pulse correctly or capture the data pulse incorrectly. The synchronous cell 600 correctly captures a data pulse of the input data signal DIN when it generates the output data signal DOUT at a level that correctly or accurately indicates the level of the input data signal DIN at its data input terminal D at the time the synchronous cell 600 detects a triggering transition of the clock signal CLK. For example, the synchronous cell 600 correctly captures a data pulse of the input data signal DIN when it generates the output data signal DOUT at a level that matches the level of input data signal DIN at the time the synchronous cell 600 detects a triggering transition of the clock signal CLK.

In addition, the synchronous cell 600 incorrectly captures a data pulse of the input data signal DIN when it generates the output data signal DOUT at a level that incorrectly or inaccurately indicates the level of the input data signal DIN at its data input terminal D at the time the synchronous cell 600 detects a triggering transition of the clock signal CLK. For example, the synchronous cell 600 incorrectly captures a data pulse of the input data signal DIN when it generates the output data signal DOUT at a level that does not match or mismatches the level input data signal DIN at the time the synchronous cell 600 detects a triggering transition of the clock signal CLK.

The synchronous cell 600 performs capturing errors when the synchronous cell 600 incorrectly captures the input data signal DIN. As used herein, a capturing error is a result that a synchronous cell produces, generates, makes, or outputs in response to incorrectly capturing a level of an input data signal. A synchronous cell may exhibit the capturing error by outputting a data pulse of its output data signal at a level that indicates a bit value of a particular bit in a bit sequence carried by the output data signal that is different than the bit value of the particular bit in the bit sequence as carried by the input data signal to the synchronous cell. In some example situations, a synchronous cell may generate a capturing error by missing a data pulse of the input data signal, such as by not detecting a triggering transition of the clock signal during a duration of the data pulse. In other example situations, a synchronous cell may generate a capturing error by generating its output data signal at the incorrect or opposite logic level from which the input data signal is at when the synchronous cell detects a capturing transition of the clock signal. In either situation, when the synchronous cell generates at least one capturing error, the output data signal that the synchronous cell generates will have or represent a bit sequence that indicates one or more different logic levels or bit levels compared to the bit sequence that the input signal has or represents. The number of different logic or bit levels is equal to the number of capturing errors that the capturing circuit makes.

In addition, the synchronous cell 600 has timing requirements, including a setup time requirement and a hold time requirement, that the timing of the data pulses of the input data signal DIN and the triggering transitions of the clock signal CLK must meet in order for the synchronous cell 600 to accurately or reliably capture the data pulses of the input data signal DIN. The timing requirements include a setup time requirement and a hold time requirement.

The setup time requirement is the minimum amount of time required for a data pulse of the input data signal DIN to be stable at the data input terminal D before the synchronous cell 600 detects a triggering transition of the clock signal CLK, or a triggering transition arrives at the clock terminal C, in order for the synchronous cell 600 to reliably identify the level of the data pulse. When a data pulse of the input data signal DIN is stably at a level that indicates the data value that the data pulse represents for a time period equal to or longer than the setup time amount, the data pulse, or more generally the input data signal DIN, meets or satisfies the setup time requirement of the synchronous cell 600. Alternatively, when the data pulse of the input data signal DIN is not stably at the level that indicates the data value that the data pulse represents for a time period equal to or longer than the setup time amount, the data pulse, or more generally the input data signal DIN, fails the setup time requirement of the synchronous cell 600. Where the synchronous cell 600 receives data pulses of the input data signal DIN that fail the setup time requirement, the synchronous cell 600 experiences or exhibits setup violations, or performs capturing actions with setup violations. A setup violation is a failure of a data pulse to be stably at its level at the data input terminal D for a time duration greater than or equal to the setup time requirement. A synchronous cell that receives data pulses at its data input terminal D that fail the setup time requirement unreliably captures the data pulses, leading to an undesirably high rate of capturing errors.

The hold time requirement is the minimum amount of time for a data pulse of the input data signal DIN to be stable at the data input terminal D after the synchronous cell 600 detects a triggering transition of the clock signal CLK, or a triggering transition arrives at the clock terminal C, in order for the synchronous cell 600 to reliably identify the level of the data pulse. When a data pulse of the input data signal DIN is stably at a level that indicates the data value that the data pulse represents for a time period equal to or longer than the hold time amount, the data pulse, or more generally the input data signal DIN, meets or satisfies the hold time requirement of the synchronous cell 600. Alternatively, when the data pulse of the input data signal DIN is not stably at the level that indicates the data value that the data pulse represents for a time period equal to or longer than the hold time amount, the data pulse, or more generally the input data signal DIN, fails the hold time requirement of the synchronous cell 600. Where the synchronous cell 600 receives data pulses of the input data signal DIN that fail the hold time requirement, the synchronous cell 600 experiences or exhibits hold violations, or performs capturing actions with hold violations. A hold violation is a failure of a data pulse to be stably at its level at the data input terminal D for a time duration greater than or equal to the hold time requirement. A synchronous cell that receives data pulses at its data input terminal D that fail the setup time requirement unreliably captures the data pulses, leading to a high rate of capturing errors.

FIG. 7 is a schematic diagram illustrating setup time and hold time requirements of the a synchronous cell. A triggering transition of the clock signal CLK is shown as occurring at a clock event time tce. An occurrence of a triggering transition of the clock signal CLK may be referred to as a clock event. When the synchronous cell 600 detects a triggering transition, a clock event occurs. A time duration from a first time t1 to the clock event time tce denotes the setup time tDS, and a time duration from the clock event time tce to a second time denotes the hold time tDH. In order to meet the setup and hold requirements of the synchronous cell 600, the level of a data pulse of the input data signal DIN should be stable from the first time t1 to the second time t2. A setup violation occurs when the level of input data signal DIN is unstable (it is still changing) after the first time t1 occurs. In other words, a setup violation occurs when the actual amount of time that the level of the input data signal DIN is stable before occurrence of the triggering transition at the clock event time tce is less than the amount of the setup time tDS. In addition, a hold violation occurs when the level of the input data signal DIN is unstable (it changes) before the second t2. In other words, a hold violation occurs when the actual amount of time that the level of the input data signal DIN is stable after occurrence of the triggering transition at the clock event time tce is less than the amount of the hold time tDH.

For a data pulse of the input data signal DIN that the synchronous cell 600 is to capture, at least a portion of the duration that a level of the data pulse is stable—e.g., at least a portion of the duration that the data pulse is at the high level or at the low level-defines a data valid window $T_{DVW}$. A data valid window $T_{DVW}$ is a time period or duration over which a given data pulse occurs during which a synchronous cell is to detect a triggering transition of the clock signal in order to avoid a setup violation and a hold violation. If the triggering transition occurs before the start of the data valid window $T_{DVW}$, then a setup violation occurs-either because the triggering transition occurred before the starting transition of the data pulse, or because the triggering transition occurred too close to after the starting transition. In addition, if the triggering transition occurs after the end of the data valid window $T_{DVW}$, then a hold violation occurs-either because the triggering transition occurred after the ending transition of the data pulse, because the triggering transition occurred too close to before the ending transition.

Referring back to the example IC design flow 500, an STA controller performs a static timing analysis on an IC design to identify setup violations and hold violations. At the end of a static timing analysis, the STA controller may generate a report identifying the setup and hold violations, including numbers of the setup violations, numbers of hold violations, which synchronous cells are experiencing the setup or hold violations, and/or timing paths that are causing the setup or hold violations. Additionally, an STA controller may fix the setup violations or the hold violations by modifying the IC in ways to adjust or alter the arrival times at which signals arrive at input terminals of the cells, such as by adding buffers as described in further detail below.

In order to identify setup violations and hold violations, an STA controller may perform a timing update operation during a timing update phase of a static timing analysis, during which the STA controller calculates delays of timing signals across timing paths from start nodes to end nodes, and arrival times at the end nodes. A timing path of an IC design is a path through which a signal can continue to traverse, without having to wait for any other triggering conditions. A triggering condition is a condition that causes a timing signal to traverse a cell of an IC design. An example triggering condition is a clock event or an arrival of a triggering transition at a clock terminal of a synchronous device. Also, a timing signal is a signal that traverses a timing path. A timing signal may be a clock signal or a data signal, and can change from being a clock signal to a data signal. For example, where a segment of a timing path extends from a clock input terminal to a data output terminal of a synchronous cell, the timing signal changes from a clock signal to a data signal as it traverses the portion of the path from the clock input terminal to the data output terminal.

Additionally, a timing path extends from a start node to an end node. A start node of a timing path is a node at which a timing signal's timing starts. An end node of a timing path is a node at which a timing signal's timing ends. When executing a timing update operation of static timing analysis, the STA controller calculates arrival times at end nodes.

Data input terminals of synchronous cells serve as end nodes since signals have to wait for a triggering transition to arrive at the clock input terminal before the signal can traverse to the data output terminal of the synchronous cell. Also, clock input terminals of synchronous cells serve as start nodes of timing paths since the presentation of the output data signal at the data output terminal does not depend on any other triggering condition other than the triggering transition at the clock input terminal.

During a timing update phase, in order to calculate delays of timing signals across the timing paths, the STA controller determines information about the timing paths in the form of parasitics information and timing constraint information. Parasitics information identifies information about the interconnects that the STA controller uses to calculate the delay. Parasitics information includes information identifying the width of the interconnects and distances between interconnects, for example. Additionally, in some example configurations, parasitics information may include capacitance from interconnects (or other conductors) to ground, capacitance between the interconnects (or other conductors), and bulk resistance of the IC. In some example embodiments, parasitics information is stored or contained in a set of IEEE Standard Parasitic Exchange Format (SPEF) files. Timing constraint information provides information that the STA controller uses to make characterizations about the periphery of an IC design and assumptions within the periphery. As an example, timing constraint information may identify how fast the IC design is to operate or how fast a signal is to propagate along a timing path. For example, timing constraint information may include transition time, which is the amount of time a timing signal takes to perform a rising transition (e.g., to go from a logic 0 level to a logic 1 level) and to perform a falling transition (e.g., to go from a logic 1 level to a logic 0 level).

In addition, in order to calculate delays over timing paths, the STA controller determines delay information of the cells of the IC design. Delay information of a cell may identify a propagation delay from an input to an output of a cell. The delay information may identify propagation delays for both logic cells and synchronous cells. The STA controller may identify the delay information by identifying a standard cell library of the cells of a given IC design on which the STA controller is to perform static timing analysis.

Additionally, during a timing update phase, the STA controller identifies the timing paths in an IC design for which to calculate delays, calculates the delays over the timing paths using the parasitics, the timing constraints, and the delay information, and calculates arrival times at end nodes of the timing paths. In general, the arrival times are sums of the delays over the respective timing paths.

Upon identifying the arrival times, the STA controller may perform a timing violation identification operation during a timing violation identification phase of the static timing analysis, during which the STA controller identifies whether the arrival times satisfy or violate each of the setup time requirements and the hold time requirements of the synchronous cells C(S). For example, the STA controller may know the data valid window information of the synchronous cells C(S) (e.g., the required times at which the timing signals are to arrive), and determine if any of the arrival times lead to negative slack. If so, the STA controller may identify the violations as either setup violations or hold violations. For at least some example configurations, the timing violation identification operation may be separated into two components, including a setup violation analysis during which the STA controller searches for and identifies setup violations, and a hold violation analysis during which the STA controller searches for and identifies hold violations.

In addition, an STA controller may check for setup violations at certain nodes of timing paths by determining if the slowest moving or latest arriving data affecting logic levels at the nodes arrives or is available before a required time. In order to determine setup violations, the delays that the STA controller calculates may include maximum delays of the timing signals over the timing paths. In this context, a setup analysis is a maximum delay analysis, in that the STA controller determines whether a maximum delay of the timing signals causes the pulses of the signals to arrive too late or too close to before a triggering edge of a clock signal to fail the setup time requirement, in turn causing a setup violation.

Also, an STA controller may check for hold violations at certain nodes of timing paths by determining if the fastest moving or earliest next data arrives, or is available, at the nodes too soon or too early—i.e., before the minimum amount of time for the current data to be stable at the nodes is met. In order to determine hold violations, the delays that the STA controller calculates may include minimum delays of the timing signals over the timing paths. In this context, a hold analysis is a minimum delay analysis, in that the STA controller determines whether a minimum delay of the timing signals causes next pulses of the signals to arrive too soon or too close to after a triggering edge of a clock signal to fail the hold time requirement, in turn causing a hold violation.

Additionally, upon identifying timing violations, the STA controller may perform a timing violation fix phase, during which the STA controller fixes the setup violations or hold violations by modifying the IC design to alter the arrival times and eliminate the timing violations. One way that an STA controller may fix setup violations is by increasing a drive strength of gates in violating paths. Additionally, one way that an STA controller may fix hold violations is by adding buffers to violating paths in order to delay signals, and in turn adjust the arrival times to satisfy the hold time requirements.

FIG. 8A shows a block diagram of a portion of an example IC design for which an STA controller may perform the improved STA timing analysis. The portion of the example IC design includes three synchronous cells C(S) in the form of flip flops, including a first flip flop FF1, a second flip flop FF2, and a third flip flop FF3. The portion of the example IC design also includes two logic cells C(L) in the form of NAND gates, including a first NAND gate NAND1 and a second NAND gate NAND2. FIG. 8A also shows a clock signal CLK distributed to the clock inputs of the three flip flops FF1, FF2, FF3.

To perform a timing update operation during a timing update phase of a static timing analysis on an IC design, the STA controller may be configured to identify a description of the IC design, such as in the form of a gate-level netlist, to identify timing paths formed from the flip flops, the NAND gates, and the interconnects connecting the input and output terminals of the flip flops and NAND gates to each other. In particular, the STA controller may identify four timing paths, including a first timing path P1, a second timing path P2, a third timing path P3, and a fourth timing path P4. In particular, the STA controller, through analysis of the gate level netlist, may identify the first timing path P1 as the clock input terminal C of the first flip flop FF1 as the start node, and the data input terminal D of the third flip flop FF3 as the end node. The STA controller may further identify the first timing path P1 as extending from the clock input terminal C to the data output terminal Q of the first flip flop FF1, from the data output terminal Q of the first flip flop FF1 to a first input terminal I1 of the first NAND gate NAND1, from the first input terminal I1 to an output terminal O of the first NAND gate NAND1, from the output terminal O of the first NAND gate NAND1 to a second input terminal I2 of the second NAND gate NAND2, from the second input terminal I2 to an output terminal O of the second NAND gate NAND2, and from the output terminal O of the second NAND gate NAND2 to the data input terminal D of the third flip flop FF3.

In addition, the STA controller, through analysis of the gate level netlist of the IC design, may identify the second timing path P2 as having the clock input terminal C of the second flip flop FF2 as its start node, and the data input terminal D of the third flip flop FF3 as its end node. The STA controller may further identify the second timing path P2 as extending from the clock input terminal C to the data output terminal Q of the second flip flop FF2, from the data output terminal Q of the second flip flop FF2 to a second input terminal I2 of the first NAND gate NAND1, from the second input terminal I2 to an output terminal O of the first NAND gate NAND1, from the output terminal O of the first NAND gate NAND1 to a second input terminal I2 of the second NAND gate NAND2, from the second input terminal I2 to an output terminal O of the second NAND gate NAND2, and from the output terminal O of the second NAND gate NAND2 to the data input terminal D of the third flip flop FF3.

In addition, the STA controller, through analysis of the gate level netlist of the IC design, may identify the third timing path P3 has having the first input terminal I1 of the second NAND gate NAND2 as its start node, and the data input terminal D of the third flip flop FF3 as its end node. The STA controller may further identify the third timing path P3 as extending from the first input terminal I1 of the second NAND gate NAND2, from the first input terminal I1 to the output terminal O of the second NAND gate NAND2, and from the output terminal O of the second NAND gate NAND2 to the data input terminal D of the third flip flop FF3. Additionally, the STA controller, through analysis of the gate level netlist of the IC design, may identify the fourth timing path P4 as having the clock input terminal C of the third flip flop FF3 as its start node, and that extends from the clock input terminal C to the data output terminal Q of the third flip flop FF3.

Upon identifying the timing paths P1, P2, P3, P4, the STA controller may calculate the delays over each of the timing paths P1, P2, P3, P4 based on the parasitics information, the timing constraints, and the propagation delay information of the cells. For some example configurations, the STA controller may calculate maximum delays and minimum delays for timing paths that can have different delays. For example, if the first flip flop FF1 and the second flip flop FF2 have different delays between their respective clock and data output terminals C, D, timing signals may arrive at different times at the first and second inputs I2, I2, which can affect or create different delay calculations over shared segments of the two paths P1, P2. In addition or alternatively, some logic cells C(L) may have different delays for when the timing signals perform rising transitions and calling transitions. To account for the differences, the STA controller may traverse the timing paths several times to calculate different delay amounts for different rising and falling transition situations. In addition, based on the calculated delays, the STA controller may calculate the arrival times at the end node of the first, second, and third paths P1, P2, P3, which is the data input terminal D of the third flip flop FF3.

Upon identifying the delays the arrival times, the STA controller may perform a timing violation operation during a timing identification phase, during which the STA controller identifies timing violations, including setup violations and hold violations, in the IC design. As previously described, the STA controller may use different delay calculations and/or different arrival times based on the different delay calculations to determine setup time and hold time violations. For example, the STA controller may use maximum delays and/or latest arrival times to determine setup violations, and may use minimum delays and/or earliest arrival times to determine hold violations. If the STA controller identifies timing violations, the STA controller may perform a timing violation fix phase, where the STA controller fixes the timing violations, such as by modifying the IC design to alter the arrival times of the timing signals, as previously described.

FIG. 8B shows a modified version of the portion of the IC as shown in FIG. 8A. Suppose, for example, that during the timing violation identification phase, the STA controller identifies a hold violation for the third flip flop FF3. Then, during the timing violation fix phase, the STA controller may fix the hold violation by inserting or adding a buffer BUF in between the output terminal O of the second NAND gate NAND2 and the data input terminal D of the third flip flop FF3. The buffer BUF delays the arrival time of the timing signal at the data input terminal D, which in turn may lengthen the amount of time that pulses of the data signal output from the second NAND gate NAND2 are stable after triggering transitions of the clock signal CLK at the clock input terminal of the third flip flop FF3, which in turn removes the hold violation from the IC design.

Figure 9:
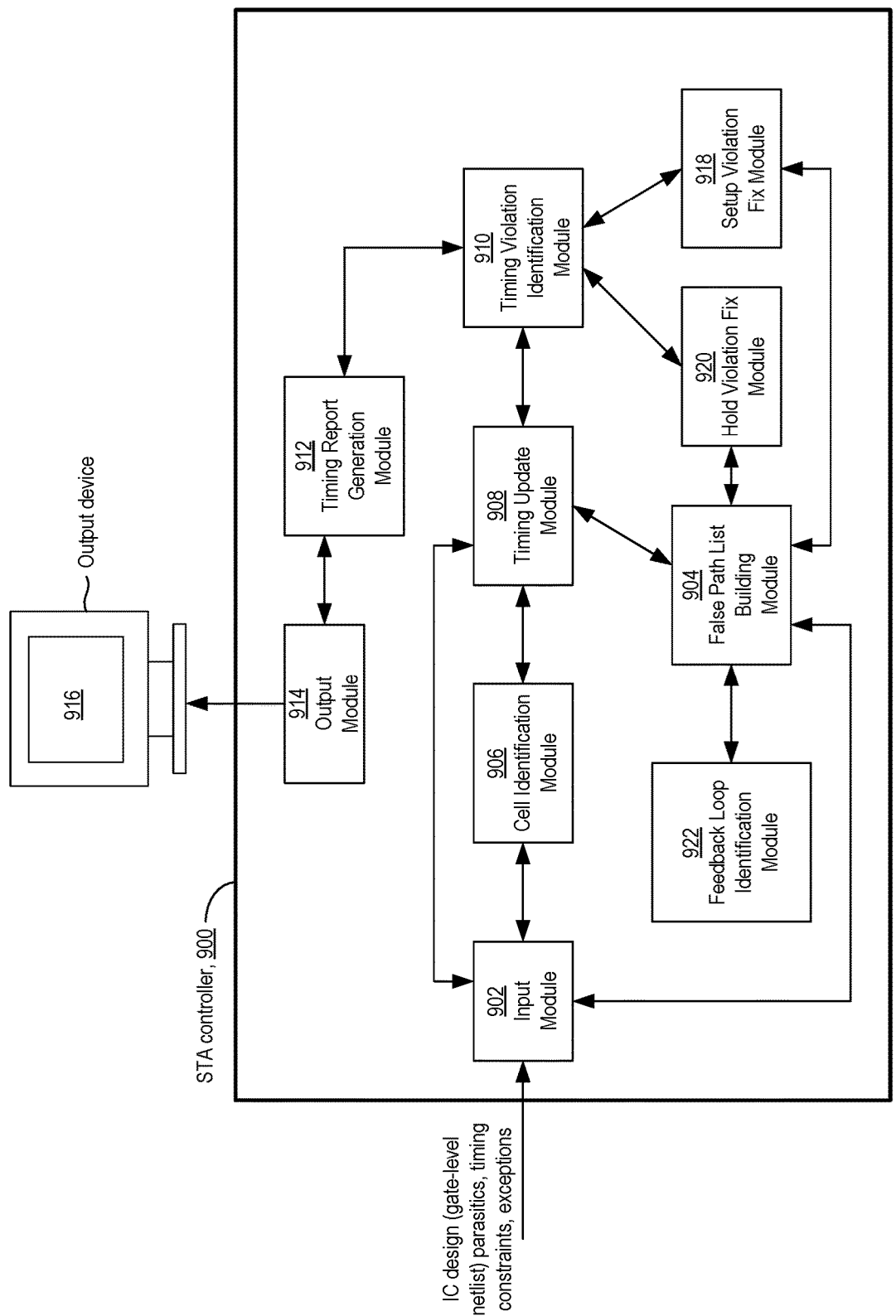
FIG. 9 is a block diagram of an example static timing analysis controller configured with a feedback loop identification module.

FIG. 9 is a block diagram of an example STA controller 900 configured to perform static timing analyses. The STA controller 900 is shown as including a plurality of modules. As used herein, a module is a component of a controller. As a component of a controller, a module may have any of hardware and/or combination of hardware and firmware (or hardware and software) configurations that a controller can have in order to perform or carry out the functions of the controller. For some example configurations, the a plurality of modules of a controller may include separate, discrete sets of circuitry, such as separate, discrete sets of logic circuits or other types of hardware circuits. For other example configurations, a plurality of modules of a controller may include the same hardware circuitry, such as the same processor for example, but include and/or execute different firmware or software, such as different sets of computer code or instructions, in order carry out their respective functions, operations, or actions. Various configurations or combinations of configurations are possible for a plurality of modules of a controller.

With particular reference to FIG. 9, the STA controller 900 may include an input module 902 that serves as the input component or input interface between the other components of the STA controller 900 and electronic circuits, devices, or circuit components external to the STA controller 900. In addition, the input module 902 may be configured to receive data or information that the STA controller 900 is to use to perform static timing analyses. The information that the input module 902 may receive includes an IC design, such as in the form of a gate-level netlist, parasitics information, timing constraints information, and exceptions information. Exceptions information identifies components, or other features or aspects, that do not have to meet timing requirements or other constraints. Types of exceptions include false paths and multicycle paths.

A false path is a timing path of an IC design that the STA controller 900 ignores when performing a static timing analysis. By ignoring a false path, the STA controller 900 refrains from calculating delays over the false path or arrival times for the false path during a timing update phase; refrains from identifying timing violations, including setup violations and hold violations, for the false path; refrains from fixing timing violations by modifying the false path, such as by inserting buffers in the false path, or combinations thereof. The exceptions information that the input module 902 receives may identify particular timing paths of an IC design as false paths, or may identify types of timing paths for the STA controller 902 to identify false paths.

A multicycle path is a timing path of an IC design that does not have to complete the propagation of the timing signals along the timing path within one clock cycle. Otherwise stated, a multiple cycle path is a timing path that communicates a data pulse over several clock cycles (more than one) before the data pulse before a synchronous cell is to capture the data pulse. In addition to identifying the multicycle path, the exceptions information may identify the number of clock cycles over which a timing signal is to propagate before it is captured.

Additionally, the input module 902 may be configured to receive at least some of the input data, such as the timing constraints and exceptions, in the form of any of various programming languages, scripts, or code. One example language is tool command language (Tcl). Data, commands, instructions, or statements formatted according to Tcl are referred to as Tcl code, Tcl script, or Tcl scripting language. The modules of STA controllers implementing Tcl as its command shell may receive inputs as Tcl code, which drives the modules to perform queries and execute processes as instructed by the Tcl code. Modules executing Tcl code may include an interpreter, such as a command-line interactive interpreter, which is generally a computer program, that when executed by a processor, performs instructions written in a programming or scripting language, such as Tcl code, without requiring the programming language to have been previously compiled into a machine language program. Other example configurations of modules of STA controllers may include types of software or firmware other than an interpreter, and/or execute other types of programming language other than Tcl, in order to carry out their respective functions.

The STA controller 900 may further include a false path list building module 904 that builds, creates, or generates false path lists for static timing analysis. A false path list is a data structure, such as in the form of a table, a chart, or a list, that identifies one or more false paths. The false path list building module 904 may be configured with a false path list template, and may build a false path list by adding one or more false paths to the false path template. In the event that the input module 902 receives false path information, the input module 902 may provide that information to the false path list building module 904. In response, the false path list may add false paths identified from the information received from the input module 902 to the false path list template.

The STA controller 900 further includes a cell identification module 906 that is configured to access or link IC designs (e.g., the gate-level netlists of the IC designs) to one or more standard cell libraries to identify or gather information about the cells of IC designs. The cell identification module 906 may either store the cell libraries locally, or may access the libraries remotely, such as over a network, through a wired connection, a wireless connection, or a combination thereof.

A network over which the cell identification module 906, or any other module of the STA controller 900, may be any type of computer network over which two electronic devices may communicate and exchange electronic data through electronic signaling. Example types of networks may include mass storage, such as a network attached storage (NAS), a storage area network (SAN), or other forms of computer or machine readable media, for example. In addition or alternatively, a network may include the Internet, local area networks (LANs), wide area networks (WANs), wire-line type connections, wireless type connections, or any combination thereof. Likewise, sub-networks that employ differing architectures or that are compliant or compatible with differing protocols may interoperate within a larger network.

The cell identification module 906 may be configured to link one or more standard cell libraries to an IC design (e.g., the gate-level netlist of the IC cell design). In response to the linking, the cell identification module 906 may build or construct a cell list, which is a data structure in the form of a table, a chart, or a list, that identifies cells of an IC design. The cell list is parsable, in that a module accessing the cell list can parse through the list to identify individual cells, including their cell types. For example, a module accessing the cell list can search for cells and readily identify cells of a particular cell type, and uniquely identify each of the cells of the same cell type from each other. For example, a module accessing the cell list can search the cell list to identify all of the D flip flops of an IC cell design, and also distinguish each of the D flip flops from one another.

In addition, the cell identification module 906 may be configured to link the cells list with the IC design (e.g., the gate-level netlist of the IC cell design). Through the linking, when a module accessing the cell list identifies or selects a cell, the module identifies where the selected cell is positioned in the IC design and/or the interconnects that connect the input and output terminals of the cell to other cells of the IC design.

Using the diagrams in FIGS. 8A, 8B as an example, the cell identification module 906 may build a cell list that identifies the three flip flops FF1, FF2, FF3, and the two NAND gates NAND1, NAND2. A module accessing the cell list may search based on cell type, such as by searching for flip flops or for NAND gates. If the module searches for NAND gates, the module would identify the first and second NAND gates NAND1, NAND2. Additionally, if the module selects the first NAND gates NAND1, the module can identify that the first input I1 is connected to the data output terminal Q of the first flip flop FF1, the second input I2 is connected to the data output terminal Q of the second flip flop FF2, and the output terminal O is connected to the second input terminal I2 of the second NAND gate NAND2.

The STA controller 900 may further include a timing update module 908 configured to perform a timing update operation during a timing update phase of a static timing analysis, which includes calculating delays and arrival times of timing paths, as previously described. To perform the timing update phase, the timing update module 908 may receive the input data from the input module 902, including the IC design, the parasitics, the timing constraints, and the exceptions. Additionally, the timing update module 908 may receive the false path list from the false path list building module 904 in order to ignore identified false paths when calculating delays and arrival times. In addition, the timing update module 908 may receive a cell list or other information identified from a cell library about the cells of the IC design, such as information from a timing abstract, for example.

The STA controller 900 may further include a timing violation identification module 910 configured to identify timing violations, including setup violations and hold violations, during timing violation identification phases of a static timing analysis. The timing violation identification module 910 may identify the timing violations based on the delays and arrival times calculated by the timing update module 908. For example, the timing violation identification module 910 may compare the arrival times of signals at the synchronous cells with required times or data valid windows to determine if pulses of the data signals are arriving too early or too late at the data input terminals relative to the arrival times of triggering transitions of the clock signals. In addition or alternatively, the timing violation identification module 910 may use maximum delays and/or arrival times derived from the maximum delays to determine setup violations, and may use minimum delays and/or arrival times derived from the minimum delays to determine hold violations.

The STA controller 900 may further include a timing report generation module 912 that generates a timing report of the timing violations identified by the timing violation identification module 910. The timing report includes any of various information about the timing violations, including a number of timing violations, including a number of setup violations and/or a number of hold violations. The timing report may also identify the synchronous cells experiencing the timing violations, including whether the synchronous cells are experiencing setup violations or hold violations. In addition or alternatively, the timing report may identify timing paths, or particular interconnects of the timing paths, that are causing the timing violations, including whether the timing paths, or the particular interconnects, are causing setup violations or hold violations.

The STA controller 900 may further include an output module 914 that is configured to output the timing report to one or more output devices 916. In general, the output device 916 is any electronic device that can provide an output that can be sensed by a person. The types of outputs include visual output, audible output, or tactile output. For particular example configurations, the output device 916 provides a visual output by including a display screen that displays the timing report in the form of a human-readable language (English, Japanese, etc.). Example output devices 916 may include a monitor connected to a graphics processor of a desktop computer that includes as a component, or is otherwise electrically connected to, the STA controller 900. Other types of electronic devices with displays may be possible, such as laptops, tablets, or mobile devices. For such configurations, the output module 914 may include graphics processing circuitry that can convert the bytes of the timing report to a graphics data format that can be displayed by the output device 916. Other types of devices, such as in the form of audio speakers or tactile devices, may also be possible. Additionally, the output module 914 may communicate with the output device 916 through any of various wired or wireless connections, either directly or over a network as previously described.

In addition, the STA controller 900 may further include a setup violation fix module 918 and a hold violation fix module 920 configured to fix timing violations during timing violation fix phases of static timing analyses. In event that the timing violation identification module 910 identifies setup violations, the setup violation fix module 918 may modify a current version of the IC design, currently accessible by the modules of the STA controller 900, in order to fix the setup violations and improve the IC design. The setup violation fix module 918 may modify a current version of the IC design by adding or removing cells from the current version, and correspondingly modifying the interconnects to add interconnects, remove interconnects, and/or change the input terminals and/or the output terminals to which the interconnects are connected. In some example configurations, the setup violation fix module 918 may fix setup violations to improve the IC design by removing buffers from violating timing paths causing the setup violations in order to reduce amounts of buffering in those paths. In addition or alternatively, the setup violation fix module 918 may replace buffers with two inverters spaced a certain distance apart from each other. Other ways to fix setup violations performed by the setup violation fix module 918 may be possible.

Additionally, in event that the timing violation identification module 910 identifies hold violations, the hold violation fix module 920 may modify a current version of the IC design in order to fix the hold violations and improve the IC design. The hold violation fix module 920 may modify a current version of the IC design by adding or removing cells from the current version, and correspondingly modifying the interconnects to add interconnects, remove interconnects, and/or change the input terminals and/or the output terminals to which the interconnects are connected. In some example configurations, the hold violation fix module 920 fixes hold violations to improve the IC design by adding one or more buffers to violating timing paths causing the hold violations.

Figure 10:
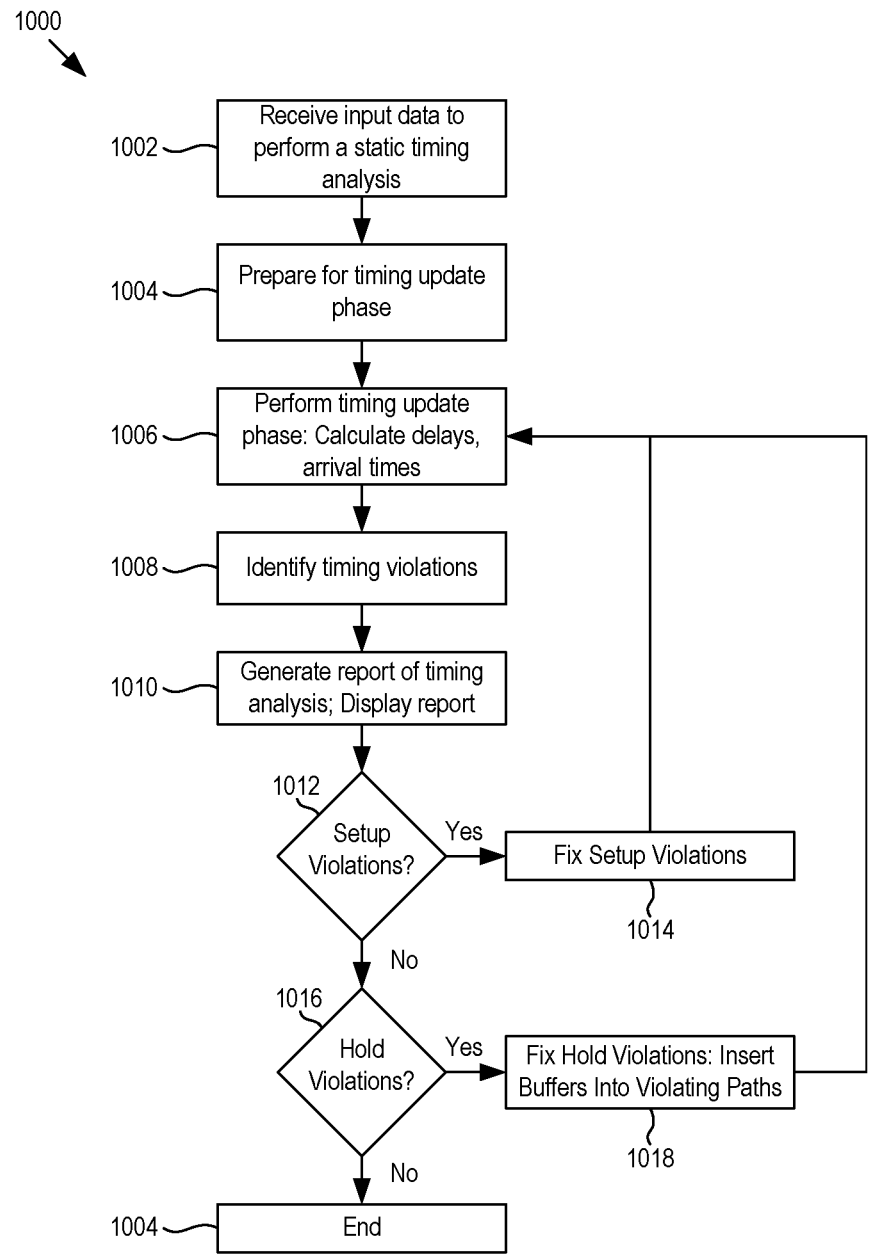
FIG. 10 is a flow chart of an example method of a static timing analysis.

FIG. 10 shows an example method 1000 of performing a static timing analysis on an IC design. The method 1000 is described with reference to the STA controller 900 of FIG. 9. At block 1002, the input module 902 receives input data to perform a static timing analysis. The input data includes a description of the IC design, such as a gate-level netlist, as well as other information, including parasitics, timing constraints, and exceptions, as previously described. At block 1004, the STA controller 900 may prepare for the timing update phase, which generally includes generating or providing any information that the timing update module 908 needs to perform the timing update phase. For example, the false path list building module 904 may build or create a false path list based on the exceptions information, and the cell identification module 906 may build or create a cell list. Also, prior to the timing update phase, the various modules, such as the input module 902, the false path list building module 904, and the cell identification module 906 may provide their respective information to the timing update module 908 for use to calculate the delays and arrival times of the timing paths.

At block 1006, the timing update module 908 may perform a timing update operation during a timing update phase by calculating delays over timing paths and arrival times at end nodes. For at least some example methods, during the timing update operation, the timing update module 908 identifies the false paths from the false path list, and ignores or refrains from calculating delays and arrival times for the false paths. By refraining from calculating delays and arrival times for false paths, the timing update module 908 may generate sets of maximum and minimum delays independent of and/or excluding delays in the false paths. In turn, the timing update module 908 may generate sets of delays, including different maximum and minimum delays, for the timing paths than it would have had it not identified those timing paths as false paths and ignored them during the timing update operation.

At block 1008, the timing violation identification module 910 may identify timing violations, including setup violations and hold violations, based on the delays and/or arrival times calculated during the timing update phase. For example, the timing violation identification module 910 may determine setup violations based on minimum delays, and hold violations based on maximum delays. Since the timing update module 908 did not calculate delays or arrival times for the false paths, then the timing violation module 910 may determine or identify setup violations or hold violations independent of delays in the paths identified as false paths. In turn, the timing violation identification module 910 may refrain from identifying timing violations, including setup violations and/or hold violations, for false paths. Additionally, at block 1010, the timing report generation module 912 may generate a timing report of the timing violations. The timing report generation module 912 may communicate with the output module 914 to display the timing report.

At block 1012, if the timing violation identification module 910 determined any setup violations, then at block 1014, the setup violation fix module 918 may fix the setup violations by modifying the IC design to adjust the arrival times of the timing signals. For methods where the timing violation identification module 910 identifies setup violations dependent on false paths in a false path list, then the timing violation identification module 910 will not identify setup violations for the false paths. In turn, the setup violation fix module 918 will perform a setup violation fix operation dependent on the false paths, which will include leaving the false paths unchanged in order to fix the setup violations. The method 1000 may then proceed back to block 1006, where the timing update module 908 performs another timing update operations by calculating delays and arrival times over timing paths of the modified IC design. The method 1000 may proceed in this manner until the timing violation identification module 910 no longer identifies any setup violations.

At block 1016, if the timing violation identification module 910 identifies any hold violations, then at block 1018, the hold violation fix module 920 fixes the hold violations by modifying the IC design to adjust the arrival times of the timing signals. In particular, the hold violation fix module 920 inserts buffers into timing paths determined to cause the hold violations. For methods where the timing violation identification module 910 identifies hold violations dependent on false paths in a false path list, then the timing violation identification module 910 will not identify hold violations for the false paths. In turn, the hold violation fix module 920 will perform a hold violation fix operation dependent on the false paths, which will include leaving the false paths unchanged in order to fix the hold violations.

The method 1000 may then proceed back to block 1006, where the timing update module 908 performs another timing update phase and calculates delays and arrival times over the modified IC design. As shown in the flow chart in FIG. 10, the setup violation fix module 918 may fix setup violations resulting from modifying the IC design from hold violations before the hold violation fix module 920 further fixes any hold violations resulting from further modification of the IC design to fix the setup violations. The method 1000 may proceed in this iterative manner of fixing setup violations, fixing hold violations, and repeating the timing update phase until the timing violation module 910 does not identify any setup violations or hold violations.

Also, in some example methods, the timing update module 908 may perform different timing update operations, such as by calculating different delays and/or arrival times in different stages, for setup and hold violation analyses. For example, at block 1006, the timing update module 908 may calculate maximum delays and arrival times based on the maximum delays used for identifying setup violations at block 1008. At block 1012, if there are no setup violations, then before proceeding to block 1016, the timing update module 908 may again perform a timing update operation by calculating minimum delays and arrival times based on the minimum delays used for identifying hold violations at block 1016. In other methods, such as the method 1000 shown in FIG. 10, the timing update module 908 may generate all of the delays and/or arrival times that the timing violation identification module 910 needs to determine both setup violations and hold violations at block 1006.

At the end of a static timing analysis, the modified version of the IC design may be larger in size compared to the original version of the IC design at the start of the static timing analysis due to the hold violation fix module 920 adding buffers into the IC design. While the addition of buffers may be necessary to remove timing violations, the STA controller 900 may be overly pessimistic in that it identifies too many timing violations, and in turn adds to buffers to the IC design. The term pessimism may be used to describe the ability of the STA controller to over-identify the number of timing violations and overcompensate for timing problems in the IC design by adding too many buffers. The more pessimistic an STA controller is, the higher the number of timing violations it tends to identify and the more buffers it tends to add into the IC design. Overcompensating for the timing violations is undesirable since adding more buffers than is necessary results in an IC design that is larger than necessary.

The STA controller 900 may be reduce buffer counts by ignoring certain paths when performing a static timing analysis. When ignoring a path during a static timing analysis, the timing update module 908 may ignore or refrain from calculating delays and arrival times for the path, the timing violation identification module 910 may ignore or refrain from identifying a path as causing a hold violation, and/or the hold violation fix module 902 may ignore or refrain from adding a buffer to the path, which in turn reduces buffer counts.

One way to ignore paths to minimize buffer count is through use of the false path list. As previously described, the timing update module 908 may ignore or refrain from calculating delays and arrival times for false paths. In addition or alternatively, the timing violation identification module 910 may ignore or refrain from identifying a false path as causing a hold violation. In addition or alternatively, the hold violation fix module 920 may ignore or refrain from fixing false paths for hold violations. That is, the hold violation fix module 920 may refrain from adding buffers to false paths to fix hold violations. However, other ways the STA controller 900 may ignore certain paths for static timing analysis may be possible. For example, the STA controller 900 may add a path to multi-cycle path list or otherwise identify a path in a multi-cycle list, or may relax a margin of the path. Such actions may similarly cause or enable the STA controller 900 to ignore a path when performing static timing analysis.

Referring back to FIG. 9, the STA controller 900 performs improved static timing analyses by enhancing the ability of the timing violation identification module 910 to identify more optimized numbers of hold violations, and/or by enhancing the ability of the hold violation fix module 920 to fix hold violations by adding more optimum numbers of buffers to the IC design. The STA controller 900 is improved through inclusion of a feedback loop identification module 922 that identifies invariable flip flop feedback loops included in an IC design, and adds the invariable flip flop feedback loops to the false path list. Through inclusion of invariable flip flop feedback loops to the false list, the timing update module 908 refrains from analyzing delays or calculating arrival times for the invariable flip flop feedback loops, the timing violation identification module 910 refrains from identifying hold violations for the invariable flip flop feedback loops, and/or the hold violation fix module 920 refrains from inserting buffers into invariable flip flop feedback loops in order to fix hold violations. For example, because the timing update module 908 does not calculate delays for invariable flip flop feedback loops since they were included in the false path list, the timing violation identification module 910, in turn, may refrain from identifying hold violations based on invariable flip flop feedback loops. In turn, the timing paths to which the hold violation fix module 920 determines to add buffers will not include invariable flip flop feedback loops.

As described in further detail below, the feedback loop identification module 922 may identify invariable flip flop feedback loops as false paths because the timing of signals over such feedback loops does not create timing violations since the flip flop FF will always generate the next pulse of its output data signal at the same logic level as the current pulse of the output data signal. In turn, by identifying invariable flip flop feedback loops as false paths, the timing violation identification module 910 is improved because it identifies lower, and more optimal, numbers of hold violations by not identifying invariable flip flop feedback loops as violating paths. In turn, the hold violation fix circuit 920 is improved because it adds fewer, and more optimal, numbers of buffers to an IC design in order to fix the hold violations, resulting in a desirably smaller IC design that is still free of timing violations.

Complex ICs include large numbers, such as thousands, of flip flops (e.g., D flip flops), and even larger numbers of logic cells C(L), such as on the order of tens of thousands. Such complex designs may typically yield initial hold violations in the hundreds or thousands. By configuring the STA controller 900 to ignore invariable flip flop feedback loops through implementation or inclusion of the feedback loop identification module 922, the STA controller 900 may reduce the number of hold violations it identifies, in turn reducing the number of buffers it adds to the IC design. In some examples, the feedback loop identification module 922 may reduce the number of hold violations by more than half, resulting in the hold violation fix module 920 adding more than 50% fewer buffers to the IC design, which in turn may significantly reduce the overall area or footprint of the IC design, such as by more than 0.5% or more than 2%, depending on the IC design and numbers of components. Overall, the added feature of the feedback loop identification module 922 to the STA controller, and its functionality to existing static timing computer analyses, generates less pessimistic timing violations, leading to more optimized computer generated IC designs.

Figure 11:
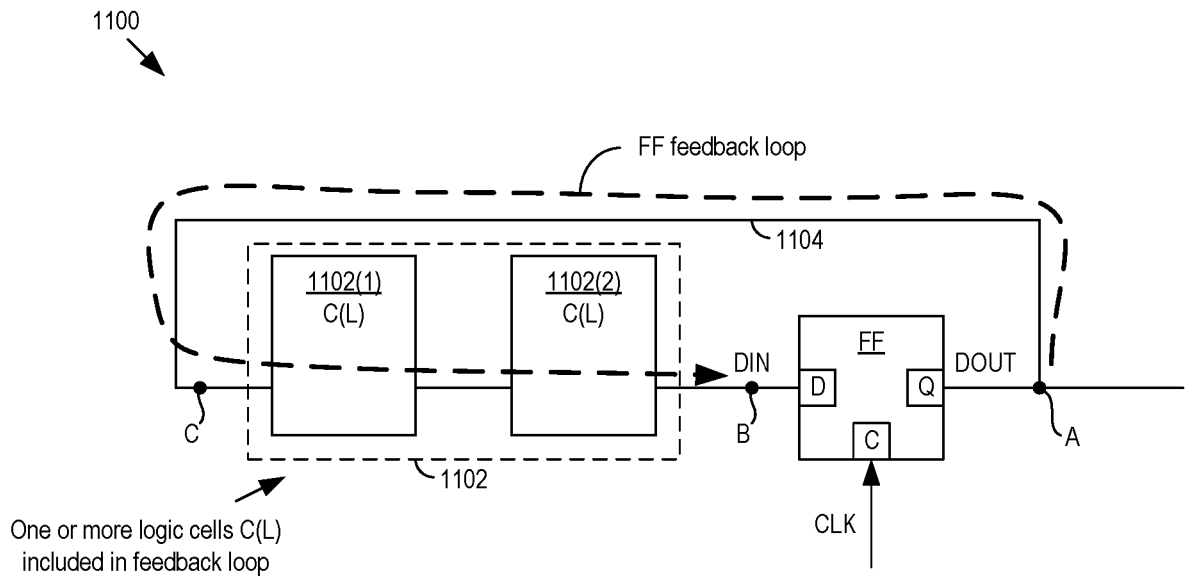
FIG. 11 is a block diagram of an example flip flop that includes an invariable flip flop feedback loop.

FIG. 11 shows a block diagram of an example flip flop FF that includes an invariable flip flop feedback loop. As previously described, an invariable flip flop feedback loop is a feedback loop of a flip flop that generates a voltage at a data input terminal of the flip flop at a logic level that is always the same as the logic level of the voltage at a data output terminal of the flip flop. A feedback loop of a flip flop is a timing path that extends from the data output terminal Q to the data input terminal D of the flip flop. The feedback loop may include one or more logic cells C(L) that determine the logic level of the voltage at the data input terminal, in that the one or more logic cells generate a voltage at the data input terminal D that is: (1) dependent on the logic level of the voltage at the data output terminal Q, and (2) always at the same logic level as the logic level of the voltage at the data output terminal Q.

With respect to FIG. 11, the flip flop FF includes a feedback loop that extends from the data output terminal Q at node A, and extends to the data input terminal D at node B. The feedback loop includes one or more logic cells C(L) 1102. The configuration in FIG. 11 includes two logic cells C(L) 1102(1), 1102(2), although numbers of logic cells C(L) other than two may be possible. Additionally, for any of various embodiments, the logic cells C(L) 1102 may have any of various configurations or connections to each other in order to perform any of various logic operations or functions.

As shown in FIG. 11, an interconnect extends from node A to an input terminal of the one or more logic cells C(L) 1102 at a node C. In addition, an output terminal of the one or more logic cells C(L) 1102 may be coupled to the data input terminal D at node B, such that the output voltage that the one or more logic cells C(L) 1102 generates is the voltage generated at the data input terminal D. The logic cells C(L) 1102 perform any of various operations, such as logic operations, to generate a voltage at the data input terminal D at a logic level that is dependent on the logic level of the voltage at node C, and in turn the logic level of the voltage at the data output terminal Q. If the one or more logic cells 1102 are configured such that if the one or more logic cells 1102 generate the voltage at the data input terminal D at a logic level dependent on the logic level of the voltage at the data output terminal Q, and that is always the same logic level as the logic level of the voltage at the data output terminal Q, then the feedback loop of the flip flop FF is an invariable flip flop feedback loop. Conversely, if the one or more logic cells 1102 are configured such that is the one or more logic cells 1102 generate the voltage at the data input terminal D at a logic level dependent on the logic level of the voltage at the data output terminal Q, and is at least sometimes at a different logic level than the logic level of the voltage at the data output terminal Q, then the feedback loop of the flip flop FF is not an invariable flip flop feedback loop.

Figure 12:
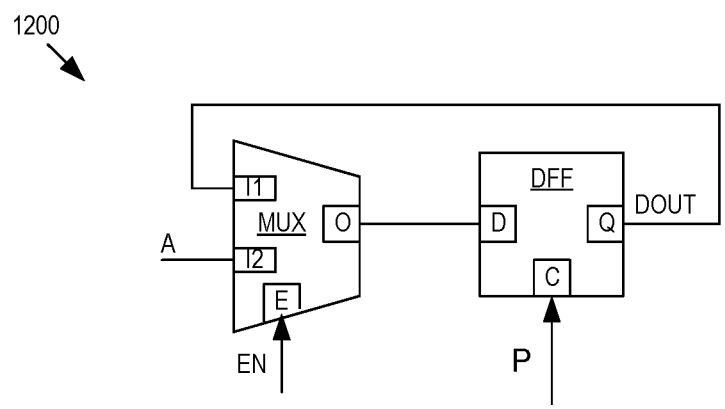
FIG. 12 is a block diagram of an enable D flip flop.

FIG. 12 shows an enable D flip flop 1200, which is an example type of circuit that has an invariable flip flop feedback loop. The enable D flip flop includes a multiplexer MUX and a D flip flop DFF. An output terminal O of the multiplexer M is connected to the data input terminal D of the D flip flop DFF. The enable D flip flop DFF includes an invariable flip flop feedback loop that extends from the data output terminal Q to a first input terminal I1 of the multiplexer MUX, from the first input terminal I1 to the output terminal O of the multiplexer MUX, and from the output terminal O of the multiplexer MUX to the data input terminal D of the D flip flop DFF.

The multiplexer MUX does not always generate the voltage at the data input terminal D at a logic level dependent on the voltage at the data output terminal Q. In particular, as shown in FIG. 12, the multiplexer MUX includes a second input terminal I2 configured to receive a data signal A, and an enable input terminal E configured to receive an enable signal EN. The multiplexer MUX forwards either the output data signal DOUT or the data signal A, depending on the level of the enable signal EN. When the multiplexer MUX forwards the data signal A to the data input terminal D, multiplexer MUX generates the voltage at the data input terminal D at a logic level independent of the logic level of the voltage at the data output terminal Q. However, when the multiplexer MUX forwards the output data signal DOUT to the data input terminal D, the multiplexer MUX generates the voltage at the data input terminal D at a logic level dependent on the logic level of the voltage at the data output terminal Q, and is at the same logic level as the logic level of the voltage at the data output terminal Q. Accordingly, the feedback loop of an enable D flip flop, as shown in FIG. 12, is an invariable flip flop feedback loop.

Figure 13:
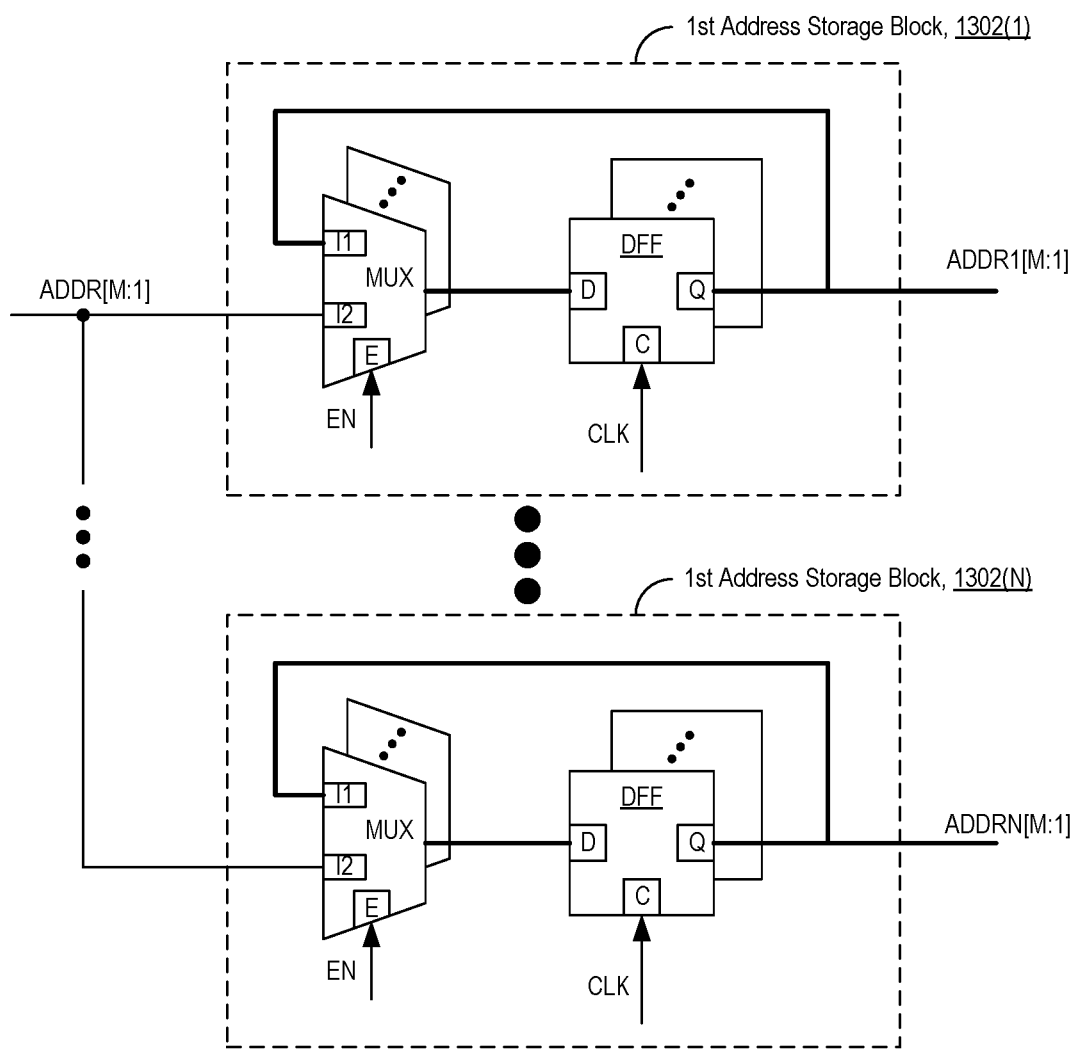
FIG. 13 is a block diagram of a plurality of address blocks configured as enable D flip flops.

FIG. 13 shows a block diagram of a plurality of address blocks 1302 configured as enable D flip flops. Each address block 1302 includes an M-number of enable D flip flops. An address block is a circuit that stores or holds an M-bit address. In some example configurations, an address block may be implemented on a memory die. For example, referring back to FIGS. 3 and 4, in a synchronous memory system, the controller IC 302 may send an M-bit address signal to the memory die 304, which may be an address, or at least part of an address, of where data is to be programmed or from where data is to be read. The memory die 304 may store the M-bit address in a data block. With reference also to FIG. 13, an address block 1302 may receive the M-bit address signal through the second input terminals I2 of the multiplexers MUX. Once the D flip flops DFF capture the address information, a controller, such as the state machine 402 may output the enable signals EN to cause the multiplexer to connect the first input terminals I1 to the outputs so that the D flip flops DFF maintain the address values at their data output terminals Q indefinitely over several clock cycles. A memory die 304 may include several address blocks, configured as enable D flip flops, to store or hold several M-bit addresses.

Referring back to FIG. 11, the feedback loop of a flip flop FF may be an invariable flip flop feedback loop in two separate transition situations, including a rising transition situation where the voltage at the data output terminal Q performs a rising transition, and a falling transition situation where the voltage at the data output terminal Q performs a falling transition. With respect to the rising transition situation, the feedback loop is an invariable flip flop feedback loop where the feedback loop transitions the voltage at the data input terminal D from a low (or logic 0) level to a high (or logic 1) level in response to or dependent on the voltage at the data output terminal Q performing a rising transition (i.e., also transitioning from a low level to a high level). For example, with respect to FIG. 11, when the output data signal DOUT performs a rising transition, the feedback loop is an invariable flip flop feedback loop where the logic cells C(L) 1102 transition the voltage at the data input terminal D (at node B) from a low level to a high level in response to the rising transition of the output data signal DOUT.

With respect to the falling transition situation, the feedback loop is an invariable flip flop feedback loop where the feedback loop transitions the voltage at the data input terminal D from a high (or logic 1) level to a low (or logic 0) level in response to or dependent on the voltage at the data output terminal Q performing a falling transition (i.e., also transitioning from a high level to a low level). For example, with respect to FIG. 11, when the output data signal DOUT performs a falling transition, the feedback loop is an invariable flip flop feedback loop where the logic cells C(L) 1102 transition the voltage at the data input terminal D (at node B)

from a high level to a low level in response to the falling transition of the output data signal DOUT.

On the other hand, a feedback loop of a flip flop may not qualify as an invariable flip flop feedback loop where the feedback loop generates the voltage at the data input terminal D in the opposite transition direction as the direction of the transition at the data output terminal. That is, the feedback loop of a flip flop may not qualify as an invariable flip flop feedback loop where the feedback loop transitions the voltage at the data input terminal D from a high level to a low level in response to a rising transition at the data output terminal Q. Similarly, the feedback loop of a flip flop may not qualify as an invariable flip flop feedback loop where the feedback loop transitions the voltage at the data input terminal D from a low level to a high level in response to a falling transition at the data output terminal Q.

Referring also to FIG. 9, the feedback loop identification module 922 may be configured to perform a traversal operation in which the feedback loop identification module traces or traverses through feedback loops of flip flops in order to determine if they are invariable flip flop feedback loops. To traverse through a feedback loop of a flip flop, the feedback loop identification module starts at the data output terminal Q of the flip flop and selects a transition type for a transition of the voltage at the data output terminal D. That is, the feedback loop identification module 922 selects either a rising transition or a falling transition for the voltage at the data output terminal Q. For a traversal operation, the transition of the voltage at the data output terminal D is referred to as an initial transition.

Upon selecting a transition type for the initial transition, the feedback loop identification module 922 begins tracing or traversing through the feedback loop under the condition that the voltage at the data output terminal Q just performed a transition of the selected transition type. While tracing through the feedback loop, when the feedback loop identification module 922 arrives at an input terminal (or gate) of a logic cell C(L), the sets a transition type (rising or falling) for the input terminal, and checks whether the logic cell C(L) is an inverting logic cell or a non-inverting logic cell. The feedback loop identification module 922 then moves to a next logic cell C(L) in the feedback loop and sets a transition type for the input terminal of the next logic cell C(L) based on the transition type it set for the prior logic cell C(L) and whether the prior logic cell C(L) is inverting or non-inverting. For example, if the feedback loop identification module 922 set a rising transition for the prior logic cell C(L) and determined that the prior logic cell C(L) is non-inverting, the feedback loop identification module 922 sets the transition type for the input terminal of the next logic cell to a rising transition. The feedback loop identification module 922 proceeds in this manner until reaching the data input terminal D of the flip flop. Upon reaching the data input terminal D, the feedback loop identification module 922 sets the data input terminal D to a transition type on whether the last logic cell C(L) is inverting or non-inverting and the transition type set at the input terminal of the last logic cell C(L).

After determining the transition type for the data input terminal D, the feedback loop identification module 922 determines whether to add the feedback loop to the false path list, or whether to reject the feedback loop. In particular, if the feedback loop identification module 922 determines that the transition type it sets for the data input terminal D matches or is the same as the transition type that it sets for the initial transition at the data output terminal Q, then the feedback loop identification module 922 identifies that the feedback loop is an invariable flip flop feedback loop, and adds the feedback loop to the false path list. On the other hand, if the feedback loop identification module 922 determines that the transition type it sets for the data input terminal D is different than the transition type that it sets for the initial transition at the data output terminal Q, then the feedback loop identification module 922 rejects the feedback loop, and does not add the feedback loop to the false path list.

In particular example configurations, the feedback loop identification module 922 may be configured to traverse through each of the feedback loops twice, once for each of the two transition situations. The feedback loop identification module 922 may traverse through the feedback loop a first time with the initial transition set to one of the transition types (either a rising transition or a falling transition), and then traverse through the feedback loop a second time with the initial transition set to the other transition type.

For such example configurations, the feedback loop identification module 922 may be configured to identify a feedback loop of a flip flop as an invariable flip flop feedback loop twice, one for each transition type. Additionally, for such example configurations, the false path list building module 904 may be configured to keep or maintain two lists, or otherwise organize invariable flip flop feedback loops, according to transition type. That is, the false path list building module 904 may maintain a first list of invariable flip flop feedback loops for initial transitions set to a rising transition, and may maintain a second list of invariable flip flop feedback loops for initial transitions set to a falling transition.

Also, at least some of the flip flops may have two output terminals, including a data output terminal Q and an inverse data output terminal Qn. In turn, some flip flops may have two feedback loops. For a given flip flop that has two output terminals Q, Qn connected to two feedback loops, the feedback loop identification module 922 may be configured to traverse through each of the feedback loops to determine whether each is an invariable flip flop feedback loop. Accordingly, for particular example configurations, for a given flip flop that includes two feedback loops, the feedback loop identification module 922 may perform four traversal operations, two for each feedback loop.

Figure 14:
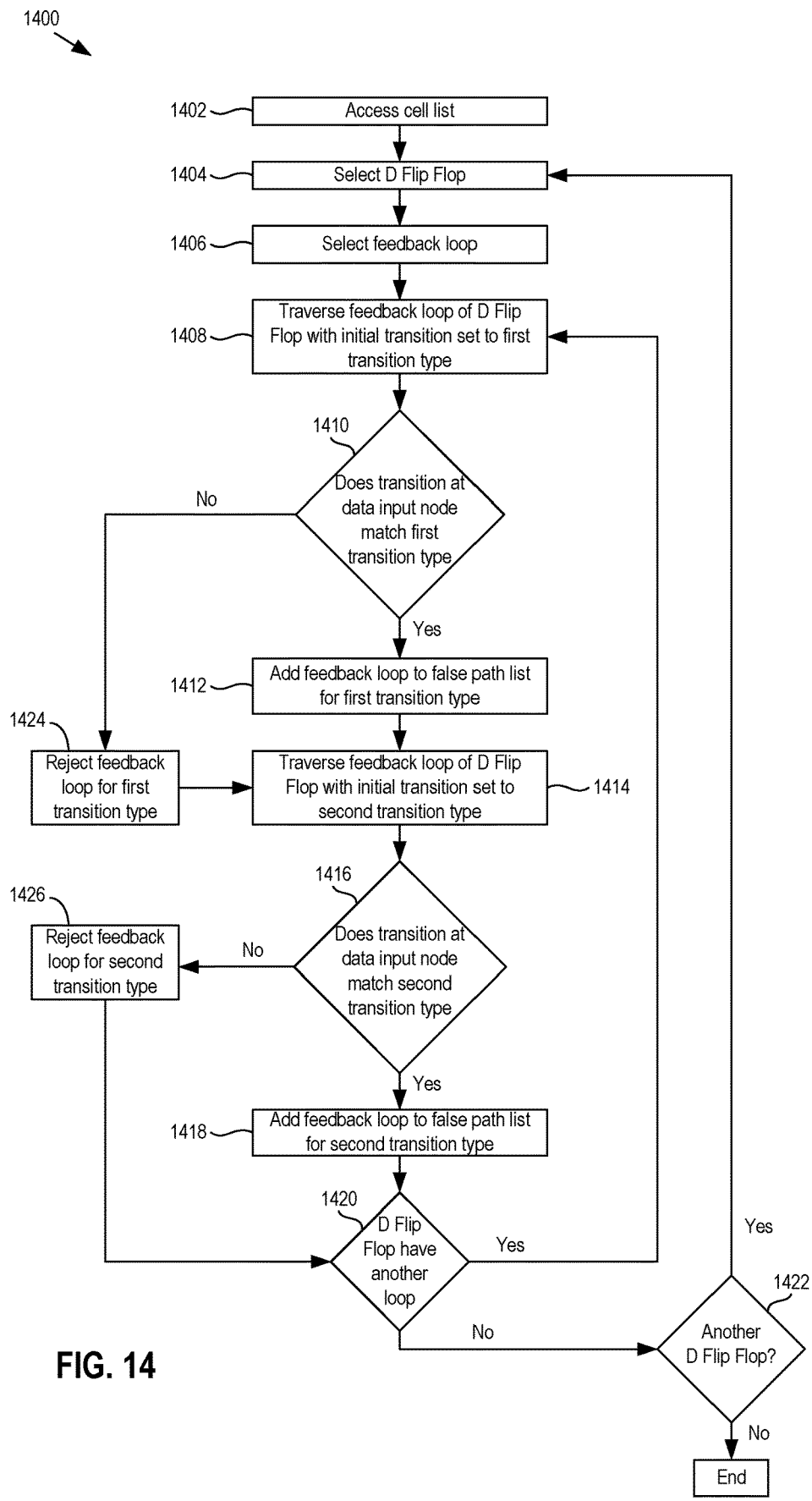
FIG. 14 is a flow chart of an example method of adding invariable flip flop feedback loops to a false path list.

FIG. 14 shows a flow chart of an example method 1400 of adding invariable flip flop feedback loops of an IC design to a false path list. The method 1400 may be part of block 1004 of the method 1000 of FIG. 10, as described in further detail below. Additionally, the method 1400 is described as being performed with the feedback loop identification module 922.

At block 1402, the feedback loop identification module 922 may access a cell list, such as one generated with the cell identification module 906. At block 1404, the feedback loop identification module 922 may identify the D flip flops of the IC design in the cell list, and select one of the D flip flops. At block 1406, the feedback loop identification module 922 may select a feedback loop of the selected flip flop. As described, a flip flop may possibly have two feedback loops, one connected to its data output terminal Q and another connected to its inverse data output terminal Qn. During the method 1400, the feedback loop identification module 922 may check timing paths connected to each of the output terminals Q, Qn to determine if either of the output terminals Q, Qn is connected to an invariable flip flop feedback loop.

At block 1408, the feedback loop identification module 922 may traverse the selected feedback loop with the initial transition at the data output terminal (Q or Qn) set to a first transition type. The first transition type may be either a rising transition or a falling transition. Upon reaching the data input terminal D, the feedback loop identification module 922 sets the data input D to either the first transition type of the second transition type based on whether the last logic cell C(L) is inverting or non-inverting and the transition type set at the input terminal of the last logic cell C(L).

At block 1410, if the feedback loop identification module 922 set the data input terminal D to the first transition type (i.e., the transition types at the data output terminal (Q or Qn) and the data input terminal D match or are the same), then at block 1412, the feedback loop identification module 922 may add the feedback loop to the false path list for the first transition type. For some example methods, the feedback loop identification module 922 may provide an identifier of the feedback loop to the false path list building module 904, and the false path list building module 904 adds the identifier to the list for the first transition type. For other example methods, the feedback loop identification module 922 has access to the false path list, and is the module that actually adds the feedback loop to the false path list. Various ways of the configuring the feedback loop identifier module 922 and/or the false path list building module 904 to add feedback loops to false path lists may be possible.

At block 1414, the feedback loop identification module 922 may again traverse the feedback loop, but with the initial transition at the data output terminal (Q or Qn) set to a second transition type. The second transition type is the opposite of the first transition type. So, if the first transition type is a rising transition, then the second transition type is a falling transition. Likewise, if the first transition type is a falling transition, then the second transition type is a rising transition. Upon reaching the data input terminal D, the feedback loop identification module 922 sets the data input terminal D to either the first transition type of the second transition type based on whether the last logic cell C(L) is inverting or non-inverting and the transition type set at the input terminal of the last logic cell C(L).

At block 1416, if the feedback loop identification module 922 set the data input terminal D to the second transition type (i.e., the transition types at the data output terminal (Q or Qn) and the data input terminal D match or are the same), then at block 1418, the feedback loop identification module 922 may add the feedback loop to the false path list for the second transition type. The feedback loop identification module 922 can either add the feedback loop to the false path list itself, or can provide an identifier to the false path list building module 904, in order to have the feedback loop added to the false path list.

At block 1420, the feedback loop identification module 922 may determine whether it has another feedback loop of the selected flip flop to check. For example, if the selected flip flop has two feedback loops, one connected to the data output terminal Q and a second connected to the inverse data output terminal Qn, and the feedback loop identification module 922 only checked the first feedback loop, the feedback loop identification module 922 may determine it still has to check the second feedback loop connected to the inverse data output terminal Qn. Accordingly, the method 1400 may proceed back to block 1408, where the feedback loop identification module 1408 traverses the second feedback loop. Alternatively, if the feedback loop identification module 922 does not have another feedback loop to check, then the method may proceed to block 1422. At block 1422, the feedback loop identification module 922 checks the cell list to determine if there are any unselected D flip flops to analyze. If not, then the method 1400 may end. If so, then the method 1400 proceeds back to block 1404, where the feedback loop identification module 922 selects another D flip flop. Then feedback loop identification module 922 then determines whether the newly selected flip flop has any invariable flip flop feedback loops.

Referring back to block 1410, if the feedback loop identification module 922 sets the data input terminal D to the second transition type such that the transition types at the data output terminal (Q or Qn) and the data input terminal D do not match or are different), then the method 1400 may proceed to block 1424, where the feedback loop identification module 922 rejects the feedback loop for the first transition type—i.e., it does not add the feedback loop to the false path list for the first transition type. The method 1400 may then to proceed to block 1414, where the feedback loop identification module 922 again traverses the feedback loop, but with the initial transition set to the second transition type.

Similarly, at block 1416, if the feedback loop identification module 922 sets the data input terminal D to first transition type such that the transition types at the data output terminal (Q or Qn) and the data input terminal D do not match or are different, then the method 1400 may proceed to block 1426, where the feedback loop identification module 922 rejects the feedback loop for the second transition type—i.e., it does not add the feedback loop to the false path list for the second transition type. The method 1400 may then proceed to block 1420, where the feedback loop identification module 922 determines if it has another feedback loop of the selected flip flop to traverse.

In addition, for at least some embodiments, the method 1400 may be performed as part of a static timing analysis. For example, with respect to the static timing analysis method 1000 of FIG. 10, the method 1400 may be performed as part of block 1004, where the modules of the STA controller 900 prepare for the timing update phase. During block 1004, the false path list building module 904 may communicate with the feedback loop identification module 922 to add invariable flip flop feedback loops to the false path lists. In turn, the timing update module 908 and/or the timing violation identification module 910 performs their respective timing update and timing violation identification phases dependent on invariable flip flop feedback loops set as false paths. In turn, the timing report generation module 912 generates its timing report, and the output module 914 displays (via the output device 916) the timing report, dependent on the invariable flip flop feedback loops set as false paths during the static timing analysis. Likewise, the hold violation fix module 920 fixes hold violations, by adding buffers, dependent on the invariable flip flop feedback loops set as false paths during the static timing analysis. As a result, the hold violation fix module 920 refrains from adding buffers to invariable flip flop feedback loops while fixing hold violations.

Additionally, for some example configurations, the feedback loop identification module 922 and/or the false path list building module 904 may execute Tcl commands or script to add false paths to the false path lists. Below are example sets of Tcl commands that the feedback loop identification module 922 and/or the false path list building module 904 may execute to add feedback loops to false path lists.

To add an invariable flip flop feedback loop where the initial transition at the data output terminal Q is a rising transition, the feedback loop identification module 922 and/or the false path list building module 904 may execute the following Tcl script:

To add an invariable flip flop feedback loop where the initial transition at the data output terminal Q is a falling transition, the feedback loop identification module 922 and/or the false path list building module 904 may execute the following Tcl script:

```
set_false_path -hold \
-from          [get_pins dffs/CLK] \
-fall_through  [get_pins dffs/Q] \
-fall_to       [get_pins dffs/D]
```

To add an invariable flip flop feedback loop where the initial transition at the inverse data output terminal Qn is a rising transition, the feedback loop identification module 922 and/or the false path list building module 904 may execute the following Tcl script:

```
set_false_path -hold \
-from          [get_pins dffs/CLK] \
-fall_through  [get_pins dffs/Qn] \
-rise_to       [get_pins dffs/D]
```

To add an invariable flip flop feedback loop where the initial transition at the inverse data output terminal Qn is a falling transition, the feedback loop identification module 922 and/or the false path list building module 904 may execute the following Tcl script:

```
set_false_path -hold \
-from          [get_pins dffs/CLK] \
-rise_through  [get_pins dffs/Qn] \
-fall_to       [get_pins dffs/D]
```

In the above Tcl script, the term "dffs" refers to a selected D flip flop. The "set_false_path-hold" indicates that feedback loop identification module 922 and/or the false path list building module 904 sets the feedback loop as a false path for determining hold violations. Accordingly, the timing update module 908 refrains from avoids calculating delays and/or arrival times for determining hold violations over the feedback loop. In addition or alternatively, the timing violation identification module 910 ignores propagation delays over the feedback loop when identifying hold violations. For example, with reference to FIG. 11, the timing violation identification module 910 may refrain from determining whether a delay from the clock input C of the flip flop FF to the data output terminal Q at node A, to the input terminal of the logic cells C(L) 1102 at node C to the data input terminal D at node B violations the hold time requirement of the flip flop FF. In turn, the hold violation fix module 920 will not insert any buffers into the feedback loop to fix any hold violations.

Also, the above Tcl commands include: the "from" Tcl command to instruct the feedback loop identification module 922 and/or the false path building module 904 to add a feedback loop to the false path list as a timing path originating from clock terminal C; the "rise_through" and "fall_through" Tcl commands to instruct the feedback loop identification module 922 and/or the false path list building module 904 to add a feedback loop to the false path list as a timing path that passes through the data output terminal Q or the inverse data output terminal Qn, and for both rising transitions and falling transitions and the output terminals Q, Qn; and the "rise_to" and "fall_to" commands to instruct the feedback loop identification module 922 and/or the false path building module 904 to add a feedback loop to the false path list as a timing path that terminates at the data input node D, and for both rising transitions and falling transitions at the output terminals Q, Qn.

For configurations of the STA controller 900 that execute Tcl commands, the modules may treat the "from" "rise_through" "fall_through" "rise_to" and "fall_to" commands as false-path constraints. When the modules of the STA controller 900 perform their respective functions, they may compare nodes of the timing paths of the IC design with the nodes identified by the false-path constraints. If a module identifies that the nodes of a given timing path match the nodes identified by the false path constraints, the module may refrain from performing its function on the given timing path. For example, during a timing update phase, the timing update module 908 may refrain from calculating delays and/or arrival times over a given flip flop feedback loop in response to identifying that the nodes of the flip flop feedback loop match nodes identified by the false-path constraints. As another example, during a timing violation identification phase, the timing violation identification module 910 may refrain from determining whether a given flip flop feedback loop violates the hold timing requirements in response to identifying that the nodes of the flip flop feedback path match nodes identified by the false path constraints. For at least some example configurations, the modules of the STA controller 900 may identify the nodes identified through the false path constraints through analysis of the false path lists generated by the false path list building module 904 and/or the feedback loop identification module 922.

In addition, for some embodiments, the STA controller 900 may be configured without the feedback loop identification module 922 prior to receipt of input data, such as an IC design (gate-level netlist), along with parasitics, timing constraints, and exceptions. Part of the exceptions may include the feedback loop identification module 922 in the form of software code, such as in the form of a Tcl script as a non-limiting example. The false path list building module 904 may include a processor and a software component, such as an interpreter, that is configured to execute the instructions of the software code to access a cell list, identify invariable flip flop feedback loops, and add those loops to false path lists. The processor, in combination with the software component and the software code, may form the feedback loop identification module 922. But for receipt of the software code by the input module 902, the STA controller 900 would not add invariable flip flop feedback loops to the false path lists during static timing analyses.

In other embodiments, the STA controller 900 is preconfigured with the feedback loop identification module 922. For example, an STA software tool or package may include, as part of its features, software code with instructions to perform the functions of the feedback loop identification module. Accordingly, when a computing device is installed or loaded with an STA software tool such that the computing device has the functionality to perform a static timing analysis (or has an STA controller 900), part of the functionality of the computing device when executing the STA software tool to perform STA analyses includes the functionality of the feedback loop identification module 922.

Accordingly, the computing device will automatically identify invariable flip flop feedback loops and add such loops to false path lists, even for situations where the input data to perform a static timing analysis on a given IC design does not include particular software instructions, such as in the form of false path constraints or exceptions, to identify invariable flip flop feedback loops.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. An apparatus comprising:
   a static timing analysis controller comprising:
   a feedback loop identification module configured to identify an invariable flip flop feedback loop of an integrated circuit design;
   a timing violation identification module configured to identify hold violations in timing paths of the integrated circuit design, wherein the timing paths exclude the invariable flip flop feedback loop; and
   a hold violation fix module configured to refrain from inserting a buffer into the timing paths dependent on excluding the invariable flip flop feedback loop.

2. The apparatus of claim 1, wherein the static timing analysis controller further comprises a timing update module configured to refrain from calculating a delay for the invariable flip flop feedback loop.

3. The apparatus of claim 1, wherein the feedback loop identification module is further configured to add the invariable flip flop feedback loop to a false path list.

4. The apparatus of claim 1, wherein the feedback loop identification module is further configured to add the invariable flip flop feedback loop to the false path list for both a rising transition and a falling transition at a data output terminal of a flip flop connected to the invariable flip flop feedback loop.

5. The apparatus of claim 1, wherein the feedback loop identification module is further configured to:
   access a cell list of the integrated circuit design;
   identify a plurality of flip flops in the cell list; and
   identify a plurality of invariable flip flop feedback loops connected to the plurality of flip flops.

6. The apparatus of claim 5, wherein the feedback loop identification module is further configured to traverse feedback loops of the plurality of flip flops to identify the plurality of invariable flip flop feedback loops.

7. The apparatus of claim 1, wherein the feedback loop identification module is configured to identify the invariable flip flop feedback loop of an enable D flip flop of the integrated circuit design.

8. The apparatus of claim 1, wherein the feedback loop identification module is configured to identify the invariable flip flop feedback loop of an address block of the integrated circuit design.

9. The apparatus of claim 1, wherein the feedback loop identification module is configured to identify the invariable flip flop feedback loop of a finite state machine of the integrated circuit design.

10. A method comprising:
    selecting, with a static timing analysis controller, a flip flop from a cell list for an integrated circuit design;
    identifying, with the static timing analysis controller, an invariable flip flop feedback loop of the flip flop;
    calculating, with the static timing analysis controller, delays of a plurality of timing paths of the integrated circuit design, wherein the plurality of timing paths exclude the invariable flip flop feedback loop; and
    adding, with the static timing analysis controller, one or more buffers into the plurality of timing paths dependent on excluding the invariable flip flop feedback loop.

11. The method of claim 10, further comprising:
    traversing, with the static timing analysis controller, through a feedback loop of the flip flop to identify the invariable flip flop feedback loop.

12. The method of claim 11, wherein the feedback loop comprises a first feedback loop, the method further comprising:
    traversing, with the static timing analysis controller, through a second feedback loop of the flip flop.

13. The method of claim 10, further comprising:
    adding, with the static timing analysis controller, the invariable flip flop feedback loop to a false path list.

14. The method of claim 10, further comprising:
    identifying, with the static timing analysis controller, hold violations in the integrated circuit design dependent on ignoring the invariable flip flop feedback loop.

15. The method of claim 10, further comprising:
    receiving, with the static timing analysis controller, a software code that instructs the static timing analysis controller to iterate through a plurality of flip flops listed in the cell list, traverse through a plurality of feedback loops connected to the plurality of flip flops, and identify a plurality of invariable flip flop feedback loops from among the plurality of feedback loops.

16. The method of claim 10, wherein the flip flop comprises an enable D flip flop.

17. A non-transitory computer readable storage medium storing computer instructions executable by a processor, the computer instructions comprising:
    instructions to identify a plurality of flip flops of an integrated circuit design;
    instructions to traverse feedback loops of the plurality of flip flops;
    instructions to determine a set of invariable flip flop feedback loops from among the feedback loops in response to the traversing;
    instructions to execute a timing update phase of a static timing analysis;
    instructions to identify hold violations in a plurality of timing paths of the integrated circuit design in response to execution of the timing update phase, wherein the plurality of timing paths exclude the set of invariable flip flop feedback loops; and
    instructions to add buffers to the integrated circuit design in response to the identified hold violations.

18. The non-transitory computer readable storage medium of claim 17, wherein at least one of the plurality of flip flops comprises an enable D flip flop.

* * * * *